US 12,555,241 B2

(12) United States Patent
Pawlowicz et al.

(10) Patent No.: US 12,555,241 B2
(45) Date of Patent: Feb. 17, 2026

(54) SYSTEM AND METHOD FOR IMAGE SEGMENTATION FROM SPARSE PARTICLE IMPINGEMENT DATA

(71) Applicant: TECHINSIGHTS INC., Ottawa (CA)

(72) Inventors: Christopher Pawlowicz, Ontario (CA); Michael Green, Ontario (CA); Alexander Sorkin, Ontario (CA); Christopher Kumar Anand, Ontario (CA); Nabil David Bassim, Ontario (CA); Yasamin Sartipi, Ontario (CA)

(73) Assignee: TECHINSIGHTS INC., Ottawa (CA)

( * ) Notice: Subject to any disclaimer, the term of this patent is extended or adjusted under 35 U.S.C. 154(b) by 657 days.

(21) Appl. No.: 17/917,872

(22) PCT Filed: Apr. 6, 2021

(86) PCT No.: PCT/CA2021/050458
§ 371 (c)(1),
(2) Date: Oct. 7, 2022

(87) PCT Pub. No.: WO2021/203194
PCT Pub. Date: Oct. 14, 2021

(65) Prior Publication Data
US 2023/0196581 A1    Jun. 22, 2023

(30) Foreign Application Priority Data

Apr. 9, 2020  (CA) .................................. CA 3078085

(51) Int. Cl.
*G06T 7/11*    (2017.01)
*G01N 23/04*   (2018.01)
(Continued)

(52) U.S. Cl.
CPC ................ *G06T 7/11* (2017.01); *G01N 23/04* (2013.01); *G06V 10/242* (2022.01); *G06V 10/761* (2022.01); *G06T 2207/10061* (2013.01)

(58) Field of Classification Search
CPC ............ G06T 7/73; G06T 7/246; G06T 7/80; G06T 2207/30244; G01C 19/005; G01C 21/005; G01C 21/28; G01B 11/002
See application file for complete search history.

(56) References Cited

U.S. PATENT DOCUMENTS

2019/0129316 A1\*  5/2019  Zhou ................... G03F 7/70633
2020/0018944 A1\*  1/2020  Fang .................... G06V 20/695
(Continued)

FOREIGN PATENT DOCUMENTS

CN    102609914 A    7/2012
CN    103210416 A    7/2013
(Continued)

OTHER PUBLICATIONS

Coca-Rodriguez Arianny et al. "Effects of Interpolation on Segmentation in Cell Imaging," Computation Y Sistemas, vol. 18, No. 1, Mar. 31, 2014, pp. 1 to 13 (XP093144829).
(Continued)

*Primary Examiner* — Andrew M Moyer
*Assistant Examiner* — Ahmed A Nasher
(74) *Attorney, Agent, or Firm* — Gray Ice Higdon

(57) ABSTRACT

Described are systems and methods for segmenting images which comprise impinging a substrate surface with a particle beam at each of a plurality of sensing locations which define a subset of locations within an area of interest of the substrate surface. An intensity value associated with post-impingement particles resulting from the impinging is measured and the measured intensity based on the intensity value of the sensing location is calculated. For each of a
(Continued)

plurality of estimated locations which define a further subset of said area of interest and a corresponding estimated intensity based on at least one of the following corresponding to one or more locations proximal to the estimated location is calculated. The plurality of estimated locations is each segmented based on the corresponding estimated intensity, each of the sensing locations, and based on the corresponding measured intensity, to correspond to one of the plurality of features.

18 Claims, 15 Drawing Sheets

(51) Int. Cl.
  *G06V 10/24* (2022.01)
  *G06V 10/74* (2022.01)

(56) References Cited

U.S. PATENT DOCUMENTS

| | | | |
|---|---|---|---|
| 2021/0027473 A1* | 1/2021 | Oya | G06V 10/44 |
| 2022/0198611 A1* | 6/2022 | Jia | H04N 1/00132 |
| 2022/0199358 A1* | 6/2022 | Goosen | G06T 7/001 |
| 2022/0318975 A1* | 10/2022 | Ouchi | G06T 9/005 |
| 2025/0172942 A1* | 5/2025 | Ebrahimi Afrouzi | A47L 9/0477 |

FOREIGN PATENT DOCUMENTS

| | | |
|---|---|---|
| CN | 106466188 A | 3/2017 |
| CN | 107316793 A | 11/2017 |
| CN | 107810518 A | 3/2018 |
| WO | 2020011580 A1 | 1/2020 |

OTHER PUBLICATIONS

Extended European Search Report for EP Patent Application 21784829.0 dated Apr. 8, 2024, 8 pages.
International Search Report for PCT Application PCT/CA2021/050458 dated Jul. 19, 2021, 3 pages.
Salzer et al.: "A two-stage approach to the segmentation of FIB-SEM images of highly porous materials", Materials Characterization, vol. 69, Mar. 30, 2012, pp. 115-126.
Written Opinion for PCT Application PCT/CA2021/050458 dated Jul. 19, 2021, 5 pages.
Chinese First Office Action in CN Patent Application 2021800273083 dated May 8, 2025, 12 pages.
Chinese Search Report, attached to Chinese First Office Action in CN Patent Application 2021800273083 dated May 8, 2025, 3 pages.
English translation of Chinese First Office Action in CN Patent Application 2021800273083 dated May 8, 2025, 12 pages.
English Translation of Chinese Search Report, attached to Chinese First Office Action in CN Patent Application 2021800273083 dated May 8, 2025, 3 pages.
Feng Yanqiu; Huang Xin; Jiang Shaofeng; Chen Wufan, Parallel MRI reconstruction algorithm based on region of interest constraints, Chinese Journal of Medical Physics, Issue 04, Jul. 15, 2007.

* cited by examiner

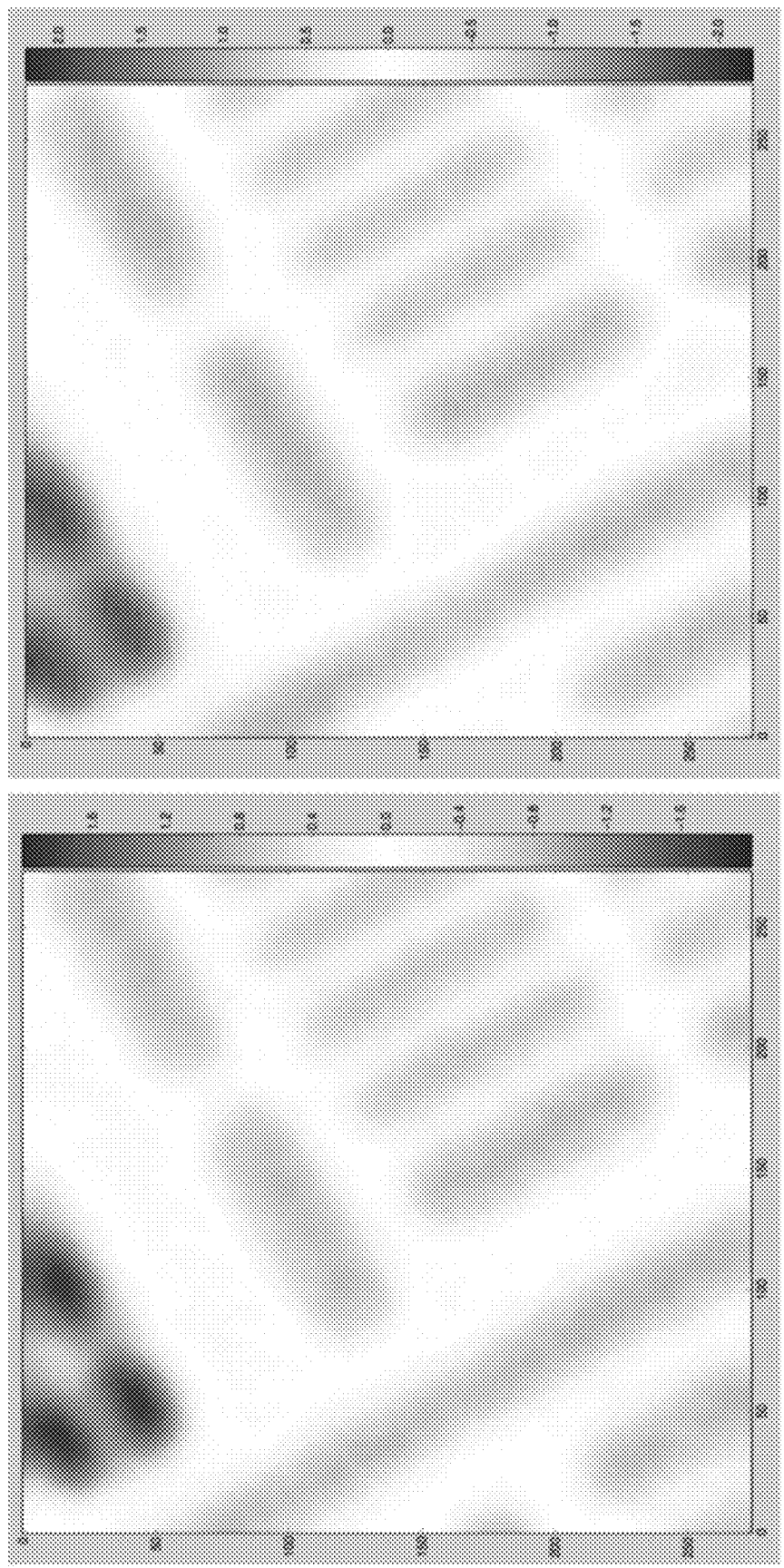

| b | 0 |
|---|---|
| p | 1.2 |
| v | 2 |
| $\lambda_1$ | 40000 |
| $\lambda_2$ | 100000 |

| b | 0.2 |
|---|---|
| p | 1.2 |
| v | 2 |
| $\lambda_1$ | 40000 |
| $\lambda_2$ | 100000 |

| b | 0 |
|---|---|
| p | 1 |
| v | 2 |
| $\lambda_1$ | 40000 |
| $\lambda_2$ | 100000 |

| b | 0.2 |
|---|---|
| p | 1.1 |
| v | 2 |
| $\lambda_1$ | 40000 |
| $\lambda_2$ | 100000 |

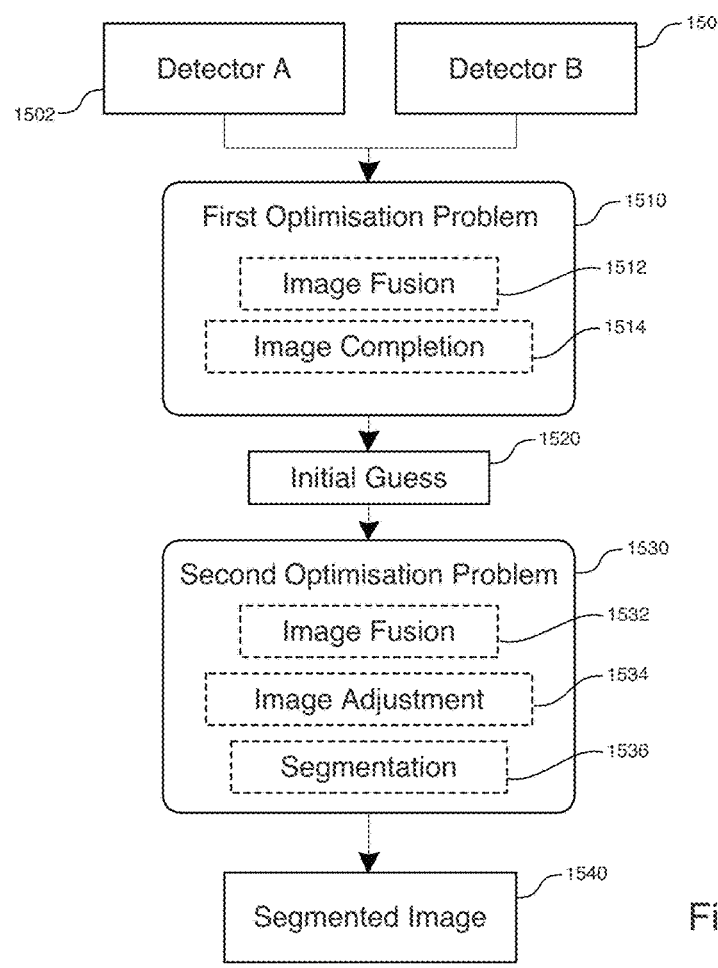
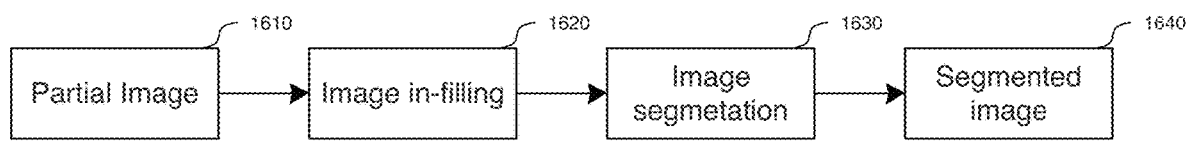
Figure 16

SYSTEM AND METHOD FOR IMAGE SEGMENTATION FROM SPARSE PARTICLE IMPINGEMENT DATA

RELATED APPLICATION

The present application is the U.S. National Phase Application under 35 U.S.C. § 371 of International Application No. PCT/CA2021/050458, filed Apr. 6, 2021, which claims priority to Canadian Patent Application serial number 3,078,085, entitled "SYSTEM AND METHOD FOR IMAGE SEGMENTATION FROM SPARSE PARTICLE IMPINGEMENT DATA", filed Apr. 9, 2020. The disclosure of each of which is herein fully incorporated by reference in their entirety.

FIELD OF THE DISCLOSURE

The present disclosure relates to imaging techniques, and, in particular, to a system and method for image segmentation.

BACKGROUND

For many raster-based imaging applications, such as electron microscopy, a bottleneck of imaging throughput may be long data acquisition times. A potential avenue to increase image acquisition speeds is to acquire partial data and/or images, and employ computational algorithms to construct a more complete image. However, doing so from sparsely sampled data in a fashion that meets requisite standards of accuracy, spatial resolution, and low noise remains a challenge.

Image fusion provides an approach to reducing noise in images while seeking to maintain desirable image properties, such as high image contrast. For instance, Milillo [MILILLO, T. et al., "Image fusion combining SEM and ToF-SIMS images," *Surface and Interface Analysis*, 47, 371-376 (2015)] improved a SEM image by combining SEM data with optical microscopy using computational algorithms. Similarly, Tarolli [TAROLLI, J. G. et al., "Improving secondary ion mass spectrometry image quality with image fusion," *Journal of the American Society for Mass Spectrometry*, 25, 2154-2162 (2014)] demonstrated an improved quality of secondary ion mass spectrometry images without sacrificing chemical specificity through image fusion with the higher intensity, and hence spatial resolution, of electron microscopy images.

In some applications, images may require segmentation, wherein labels are assigned to different pixels of an image such that pixels with the same label share similar characteristics to, for instance, separate different phases of an image. Various approaches of segmentation have been proposed for different applications. For instance, SEM images of porous materials can be segmented based on an algorithm that detects and allocates structures based on their last occurrence in the z-direction, followed by local thresholding, as presented by Salzer [SALZER, M., et al., "A two-stage approach to the segmentation of FIB-SEM images of highly porous materials," *Materials Characterization*, 69, 115-126 (2012)]. Alternatively, biological samples such as red blood cells can be segmented using contour fitting and filtering, as shown by Vromen and McCane [VROMEN, J., MCCANE, B., "Red blood cell segmentation from SEM images," 2009 *24th International Conference Image and Vision Computing New Zealand*, 44-49, IEEE (2009)]. While Sim [SIM, K., et al., "Canny optimization technique for electron microscope image colourization," *Journal of Microscopy*, 232, 313-334 (2008)] employed a combination of Canny edge detection, optimisation and supervised segmentation, which requires initial user input, and Kreshuk [KRESHUK, A., et al., "Automated detection and segmentation of synaptic contacts in nearly isotropic serial electron microscopy images," *PloS ONE*, 6, e24899. (2011)] demonstrated segmentation through machine learning techniques, which require training data sets, these approaches to segmentation may be prohibitively time-consuming for many applications. Another common approach to segmentation is a combination of thresholding, filtering, and region growing, such as the process described by Yang and Buenfeld [YANG, R., BUENFELD, N. "Binary segmentation of aggregate in SEM image analysis of concrete," *Cement and Concrete Research* 31, 437-441 (2001)].

This background information is provided to reveal information believed by the applicant to be of possible relevance. No admission is necessarily intended, nor should be construed, that any of the preceding information constitutes prior art or forms part of the general common knowledge in the relevant art.

SUMMARY

The following presents a simplified summary of the general inventive concepts described herein to provide a basic understanding of some aspects of the disclosure. This summary is not an extensive overview of the disclosure. It is not intended to restrict key or critical elements of embodiments of the disclosure or to delineate their scope beyond that which is explicitly or implicitly described by the following description and claims.

A need exists for a system and method image segmentation that overcome some of the drawbacks of known techniques, or at least, provides a useful alternative thereto. Some aspects of this disclosure provide examples of such processes and systems.

In accordance with one aspect, there is provided a method for segmenting a plurality of features of a substrate from sparse imaging data, the method comprising: impinging the substrate surface with a particle beam at each of a plurality of sensing locations, said plurality of sensing locations defining a subset of locations within an area of interest of the substrate surface, measuring at each of said plurality of sensing locations, by each of at least two particle sensors, an intensity value associated with post-impingement particles resulting from said impinging, calculating, for each sensing location, a measured intensity based on the intensity value of the sensing location, calculating, for each of a plurality of estimated locations defining a further subset of said area of interest, a corresponding estimated intensity based on at least one of the following corresponding to one or more locations proximal to said estimated location: one or more proximal measured intensities, and one or more proximal estimated intensities, and segmenting each of said plurality of estimated locations, based on said corresponding estimated intensity, and each of said sensing locations, based on said corresponding measured intensity, to correspond to one of the plurality of features.

In some embodiments, calculating the measured intensity is further based on at least one of the following corresponding to one or more locations proximal to the sensing location: one or more proximal measured intensities, and one or more proximal estimated intensities.

In some embodiments, calculating a measured intensity and said calculating a corresponding estimated intensity comprises solving an optimisation problem.

In some embodiments, the measured intensity is determined from a combination of intensity values measured by said two or more particle sensors.

In some embodiments, each estimated intensity is calculated based on a distance between the corresponding estimated location and each location of the one or more proximal measured intensities and one or more proximal estimated intensities used in calculating the estimated intensity.

In some embodiments, each said estimated intensity is related to a noise characteristic of said measured intensities as measured by one of said at least two particle sensors.

In some embodiments, the segmenting comprises calculating a greyscale value at each of said estimated locations.

In some embodiments, the segmenting comprises solving an optimisation problem.

In some embodiments, the optimisation problem comprises a penalty function.

In some embodiments, the penalty function is related to an expected intensity corresponding to each of the plurality of features of the substrate.

In some embodiments, the calculation of estimated intensities includes an initial guess for said segmenting estimated intensities to correspond to one of the plurality of features.

In some embodiments, a plurality of segmented images is generated, each of said plurality of segmented images corresponding to a designated layer of the substrate.

In some embodiments, the segmented images are vertically aligned to determine interconnections therebetween in said substrate.

In some embodiments, the method further comprises generating a segmented image illustrating connectivity of components of said substrate.

In some embodiments, the plurality of sensing locations comprises one or more lines.

In some embodiments, the one or more lines are oriented in more than one direction.

In some embodiments, the one or more lines are rotated relative to an orientation one or more of the substrate surface features.

In some embodiments, the plurality of sensing locations comprises a Lissajous pattern.

In some embodiments, the plurality of sensing locations comprises an optimised pattern.

In some embodiments, the measuring by each of at least two particle sensors is performed simultaneously.

In some embodiments, the particle beam comprises an electron beam.

In some embodiments, the two or more particle sensors comprise two or more of an in-lens sensor, a backscattered electron sensor, a segmented backscatter detector, and an Everhart-Thornley detector.

In some embodiments, the post-impingement particles comprise at least one of primary electrons and secondary electrons.

In accordance with another aspect, there is provided a method for segmenting a plurality of features of a substrate from sparse imaging data, the substrate comprising a plurality of features, the method comprising: impinging the substrate surface with a particle beam at each of a plurality of sensing locations, said plurality of sensing locations defining a subset of locations within an area of interest of the substrate surface, measuring at each of said plurality of sensing locations using a particle sensor an intensity value associated with post-impingement particles resulting from said impinging, calculating, for each sensing location, a measured intensity based on the intensity value of the sensing location, calculating, for each of a plurality of estimated locations defining a further subset of said area of interest, a corresponding estimated intensity based on at least one of the following corresponding to one or more locations proximal to said estimated location: one or more proximal measured intensities, and one or more proximal estimated intensities, and segmenting each of said plurality of estimated locations, based on said corresponding estimated intensity, and each of said sensing locations, based on said corresponding measured intensity, to correspond to one of the plurality of features.

In some embodiments, calculating the measured intensity is further based on at least one of the following corresponding to one or more locations proximal to the sensing location: one or more proximal measured intensities, and one or more proximal estimated intensities.

In some embodiments, calculating a measured intensity and said calculating a corresponding estimated intensity comprises solving an optimisation problem.

In some embodiments, each estimated intensity is calculated based on a distance between the corresponding estimated location and each location of the one or more proximal measured intensities and one or more proximal estimated intensities used in calculating the estimated intensity.

In some embodiments, the estimated intensity is calculated, at least in part, based on a noise property of said measured intensities.

In some embodiments, the segmenting comprises calculating a greyscale value at each of said estimated locations.

In some embodiments, the segmenting comprises solving an optimisation problem.

In some embodiments, the optimisation problem comprises a penalty function.

In some embodiments, the penalty function is related to an expected intensity corresponding to each of the plurality of features of the substrate.

In some embodiments, the calculation of estimated intensities includes an initial guess for said segmenting estimated intensities to correspond to one of the plurality of features.

In some embodiments, method further comprises generating a plurality of segmented images, each of said plurality of segmented images corresponding to a designated layer of the substrate.

In some embodiments, the method further comprises vertically aligning said plurality of segmented images to determine interconnections therebetween in said substrate.

In some embodiments, the method further comprises generating a segmented image illustrating connectivity of components of said substrate.

In some embodiments, the plurality of sensing locations comprises one or more lines.

In some embodiments, the one or more lines are oriented in more than one direction.

In some embodiments, the one or more lines are rotated relative to an orientation one or more of the substrate surface features.

In some embodiments, the plurality of sensing locations comprises a Lissajous pattern.

In some embodiments, the plurality of sensing locations comprises an optimised pattern.

In some embodiments, the particle beam comprises an electron beam.

In some embodiments, the particle sensor comprises one of an in-lens sensor, a backscattered electron sensor, a segmented backscatter detector, and an Everhart-Thornley detector.

In some embodiments, the post-impingement particles comprise at least one of primary electrons and secondary electrons.

In accordance with another aspect, there is provided a system for segmenting a plurality of features of a substrate from sparse imaging data, the substrate comprising a plurality of features, the system comprising: a digital application operable to receive as input sparse imaging data related to an intensity value, as measured by each of at least two particle sensors, associated with post-impingement particles resulting from impingement of the substrate surface with a particle beam at each of a plurality of sensing locations, said plurality of sensing locations defining a subset of locations within an area of interest of the substrate, said digital application further operable to calculate, for each sensing location, a measured intensity based on the intensity value of the sensing location, calculate, for each of a plurality of estimated locations defining a further subset of said area of interest, a corresponding estimated intensity based on at least one of the following corresponding to one or more locations proximal to said estimated location: one or more proximal measured intensities, and one or more proximal estimated intensities, and segment each of said plurality of estimated locations, based on said corresponding estimated intensity, and each of said sensing locations, based on said corresponding measured intensity, to correspond to one of the plurality of features.

In some embodiments, the calculation of the measured intensity is further based on at least one of the following corresponding to one or more locations proximal to the sensing location: one or more proximal measured intensities, and one or more proximal estimated intensities.

In some embodiments, calculating said measured intensity and said corresponding estimated intensity comprises digitally solving an optimisation problem.

In some embodiments, the measured intensity is determined from a combination of intensity values measured by said two or more particle sensors.

In some embodiments, each said estimated intensity is calculated based on a distance between the corresponding estimated location and each location of the one or more proximal measured intensities and one or more proximal estimated intensities used in calculating the estimated intensity.

In some embodiments, each said estimated intensity is related to a noise characteristic of said measured intensities as measured by one of said at least two particle sensors.

In some embodiments, the digital application is operable to calculate a greyscale value at each of said estimated locations for segmentation.

In some embodiments, the digital application is operable to segment said estimated intensities via solving an optimisation problem.

In some embodiments, the optimisation problem comprises a penalty function.

In some embodiments, the penalty function is related to an expected intensity corresponding to each of the plurality of features of the substrate.

In some embodiments, the calculation of estimated intensities includes an initial guess for said segmenting estimated intensities to correspond to one of the plurality of features.

In some embodiments, the system is further operable to generate a plurality of segmented images, each of said plurality of segmented images corresponding to a designated layer of the substrate.

In some embodiments, the system is further operable to vertically align said plurality of segmented images to determine interconnections therebetween in said substrate.

In some embodiments, the system is further operable to generate a segmented image illustrating connectivity of components of said substrate.

In some embodiments, the plurality of sensing locations comprises one or more lines.

In some embodiments, the one or more lines are oriented in more than one direction.

In some embodiments, the one or more lines are rotated relative to an orientation one or more of the substrate surface features.

In some embodiments, the plurality of sensing locations comprises a Lissajous pattern.

In some embodiments, the plurality of sensing locations comprises an optimised pattern.

In some embodiments, the particle beam comprises an electron beam.

In some embodiments, the two or more particle sensors comprise two or more of an in-lens sensor, a backscattered electron sensor, a segmented backscatter detector, and an Everhart-Thornley detector.

In some embodiments, the post-impingement particles comprise at least one of primary electrons and secondary electrons.

In some embodiments, the system further comprises an apparatus operable to impinge the substrate with a particle beam and comprising said two or more particle sensors.

In some embodiments, the apparatus is a scanning electron microscope, and transmission electron microscope, or a tunneling electron microscope.

In accordance with another aspect, there is provided a system for segmenting a plurality of features of a substrate from sparse imaging data, the substrate comprising a plurality of features, the system comprising: a digital application operable to receive as input sparse imaging data related to an intensity value, as measured by a particle sensor, associated with post-impingement particles resulting from impingement of the substrate surface with a particle beam at each of a plurality of sensing locations, said plurality of sensing locations defining a subset of locations within an area of interest of the substrate, said digital application further operable to calculate, for each sensing location, a measured intensity based on the intensity value of the sensing location, calculate, for each of a plurality of estimated locations defining a further subset of said area of interest, a corresponding estimated intensity based on at least one of the following corresponding to one or more locations proximal to said estimated location: one or more proximal measured intensities, and one or more proximal estimated intensities, and segment each of said plurality of estimated locations, based on said corresponding estimated intensity, and each of said sensing locations, based on said corresponding measured intensity, to correspond to one of the plurality of features.

In some embodiments, calculating the measured intensity is further based on at least one of the following corresponding to one or more locations proximal to the sensing location: one or more proximal measured intensities, and one or more proximal estimated intensities.

In some embodiments, calculating the measured intensity and said corresponding estimated intensity comprises digitally solving an optimisation problem.

In some embodiments, each estimated intensity is calculated based on a distance between the corresponding estimated location and each location of the one or more proximal measured intensities and one or more proximal estimated intensities used in calculating the estimated intensity.

In some embodiments, the estimated intensity is calculated, at least in part, based on a noise property of said measured intensities.

In some embodiments, the digital application is operable to segment said estimated intensities by calculating a greyscale value at each of said estimated locations.

In some embodiments, the digital application is operable to segment said estimated intensities by solving an optimisation problem.

In some embodiments, the optimisation problem comprises a penalty function.

In some embodiments, the penalty function is related to an expected intensity corresponding to each of the plurality of features of the substrate.

In some embodiments, the calculation of estimated intensities includes an initial guess for said segmenting estimated intensities to correspond to one of the plurality of features.

In some embodiments, the digital application is further operable to generate a plurality of segmented images, each of said plurality of segmented images corresponding to a designated layer of the substrate.

In some embodiments, the digital application is further operable to vertically align said plurality of segmented images to determine interconnections therebetween in said substrate.

In some embodiments, the system is further operable to generate a segmented image illustrating connectivity of components of said substrate.

In some embodiments, the plurality of sensing locations comprises one or more lines.

In some embodiments, the one or more lines are oriented in more than one direction.

In some embodiments, the one or more lines are rotated relative to an orientation one or more of the surface features.

In some embodiments, the plurality of sensing locations comprises a Lissajous pattern.

In some embodiments, the plurality of sensing locations comprises an optimised pattern.

In some embodiments, the particle beam comprises an electron beam.

In some embodiments, the particle sensor comprises one of an in-lens sensor, a backscattered electron sensor, a segmented backscatter detector, and an Everhart-Thornley detector.

In some embodiments, the post-impingement particles comprise at least one of primary electrons and secondary electrons.

In some embodiments, the system further comprises an apparatus operable to impinge the substrate with a particle beam and comprising said particle sensor.

In some embodiments, the apparatus is an electron microscope.

Other aspects, features and/or advantages will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein:

FIGS. 7A and 7B are images of solutions to an optimisation problem seeded with partial images acquired by a backscattered electron detector and an in-lens detector, respectively, in accordance with various embodiments;

FIG. 15 is a schematic diagram of an exemplary process flow for image segmentation from partial image data from more than one detector, in accordance with at least one embodiment; and FIG. 16 is a schematic diagram of an exemplary process for generating a segmented image from a partial image acquired from a detector, in accordance with various embodiments.

Figure 1B:
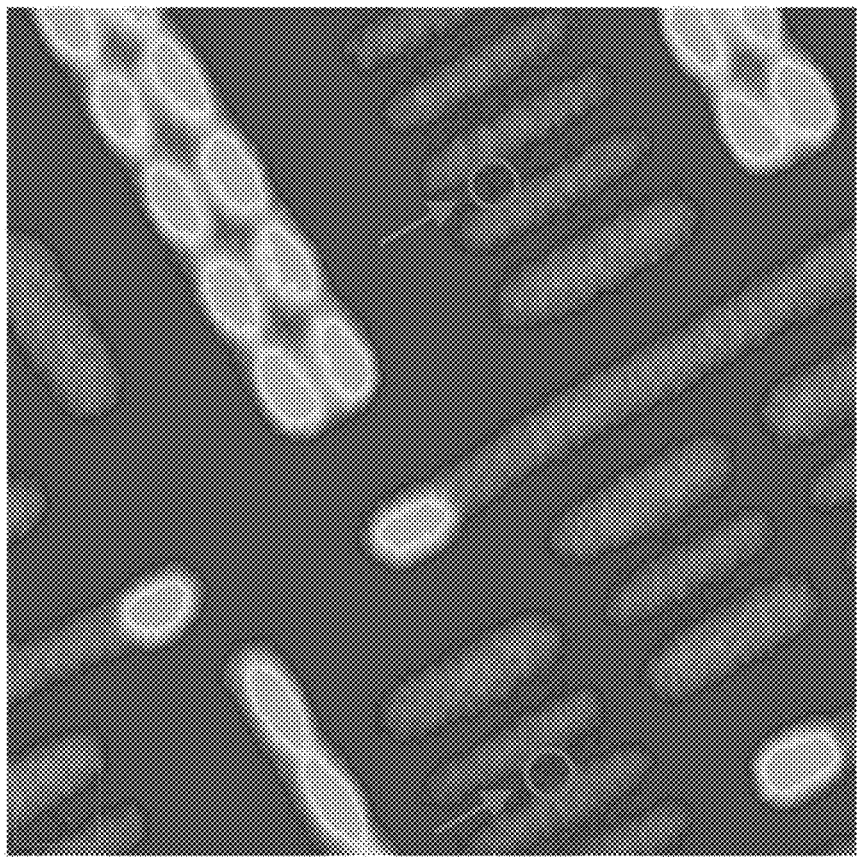
FIGS. 1A and 1B are images of a substrate segmented using two variations of thresholding.

Elements in the several figures are illustrated for simplicity and clarity and have not necessarily been drawn to scale. For example, the dimensions of some of the elements in the figures may be emphasised relative to other elements for facilitating understanding of the various presently disclosed embodiments. Also, common, but well-understood elements that are useful or necessary in commercially feasible embodiments are often not depicted in order to facilitate a less obstructed view of these various embodiments of the present disclosure.

DETAILED DESCRIPTION

Various implementations and aspects of the specification will be described with reference to details discussed below. The following description and drawings are illustrative of the specification and are not to be construed as limiting the specification. Numerous specific details are described to provide a thorough understanding of various implementations of the present specification. However, in certain instances, well-known or conventional details are not described in order to provide a concise discussion of implementations of the present specification.

Various apparatuses and processes will be described below to provide examples of implementations of the system disclosed herein. No implementation described below limits any claimed implementation and any claimed implementations may cover processes or apparatuses that differ from those described below. The claimed implementations are not limited to apparatuses or processes having all of the features of any one apparatus or process described below or to features common to multiple or all of the apparatuses or processes described below. It is possible that an apparatus or process described below is not an implementation of any claimed subject matter.

Furthermore, numerous specific details are set forth in order to provide a thorough understanding of the implementations described herein. However, it will be understood by those skilled in the relevant arts that the implementations described herein may be practiced without these specific details. In other instances, well-known methods, procedures and components have not been described in detail so as not to obscure the implementations described herein.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" may be construed as X only, Y only, Z only, or any combination of two or more items X, Y, and Z (e.g., XYZ, XY, YZ, ZZ, and the like). Similar logic may be applied for two or more items in any occurrence of "at least one . . . " and "one or more . . . " language.

Unless defined otherwise, all technical and scientific terms used herein have the same meaning as commonly understood by one of ordinary skill in the art to which this invention belongs.

Throughout the specification and claims, the following terms take the meanings explicitly associated herein, unless the context clearly dictates otherwise. The phrase "in one of the embodiments" or "in at least one of the various embodiments" as used herein does not necessarily refer to the same embodiment, though it may. Furthermore, the phrase "in another embodiment" or "in some embodiments" as used herein does not necessarily refer to a different embodiment, although it may. Thus, as described below, various embodiments may be readily combined, without departing from the scope or spirit of the innovations disclosed herein.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references, unless the context clearly dictates otherwise. The meaning of "in" includes "in" and "on."

The term "comprising" as used herein will be understood to mean that the list following is non-exhaustive and may or may not include any other additional suitable items, for example one or more further feature(s), component(s) and/or element(s) as appropriate.

The systems and methods described herein provide, in accordance with different embodiments, different examples in which images may be segmented using computational analysis algorithms. In some embodiments, such segmentation may be performed on images computationally completed from sparse data sets and/or partial images using processes and systems that are described below. While some examples herein described may make reference to images or partial images acquired from scanning electron microscopy data, the skilled artisan will appreciate that the systems and processes herein disclosed may also be applied to other imaging applications, such as those in which raster-imaging of a sample is performed, and/or those in which data is acquired by, for instance, other ion-beam, topographical, or optical imaging platforms, non-limiting examples of which may include, but are not limited to, a transmission electron microscope (TEM), an atomic force microscope (AFM), a confocal microscope, or the like.

As the process of raster imaging may be time consuming, collecting partial noisy images and completing them using computational optimisation may increase image acquisition speeds. For example, and in accordance with at least one of the various embodiments herein described, collecting every nth line of data from an otherwise typical electron microscopy imaging protocol may decrease an acquisition time by a factor of n (e.g. acquiring every fourth line of data from a substrate using a SEM may decrease the acquisition time by a factor of 4). Furthermore, such computational optimisation protocols may, in accordance with various embodiments, be tailored for additional applications. For instance, if image segmentation is desirable, an optimisation problem to be solved computationally may contain additional terms and/or variables so related to be considered during optimisation.

Various computational approaches exist to solving the issue of "in-filling" partial images. However, associated respective disadvantages limit their applicability for various situations. For instance, classical image processing uses a toolbox of procedures for operating on sets of pixels which are iterated over single pixels or regions. These methods may use global information like a pixel-value histogram in deciding what operations to perform or to control the operation of a protocol. Examples of such classical processing operations include filtering, interpolation, region shrinking, and the like. Some methods may be sophisticated, and may borrow from the other methods, operating, in some instances, in frequency space, use geometric information including 'snakes', and the like. While such approaches are usually efficient in that each step is readily understood, and therefore easier to tune and to debug, a disadvantage of classical methods may be that each process may add and/or remove information, which may be lost for subsequent processing steps. For example, initial filtering to remove apparent noise may suppress data related to a feature of interest, resulting in a loss of ability for subsequent processes to characterise that feature.

Model-based processes typically comprise a statistical model from which likely physical parameters to have produced the observed data are extracted. Examples of model-based processes may include, but are not limited to maximum likelihood estimates, Bayesian estimates, and the like. An advantage of these models is that they may simultaneously take many or all relevant probabilities into account, including measurement error, observed material property and geometric distributions, expected outcomes, and the like. It is often therefore less likely that one aspect of a model will effectively erase information useful to another aspect, although it may still be possible that practical computational methods will have the same effect in the case of nonlinear models. Furthermore, another advantage of model-based approaches is that, in many cases, one can use the same model to predict the accuracy of the output, and even use this information to design more effective scanning techniques. On the other hand, model-based methods may require experts to define a model and with reasonable understanding of the mechanism.

Optimisation protocols may also comprise machine learning methods. Rather than beginning with an understanding of the relevant physics and/or framework of a system, such processes may use generic models which have proven themselves in other applications. Resulting models may be extremely complex. However, the end user often need not understand results to apply them. An advantage is that they can be constructed quickly, and do not require an understanding of statistics or optimisation, and may, in many cases, outperform expert models, especially where no convincing model exists. However, disadvantages may include that such systems may often produce incorrect results, may be susceptible to distorted data, do not generally give any warning when they are used on data for which they are not trained, require a high amount of computation, and typically require significant human-curated data.

Figure 1A:
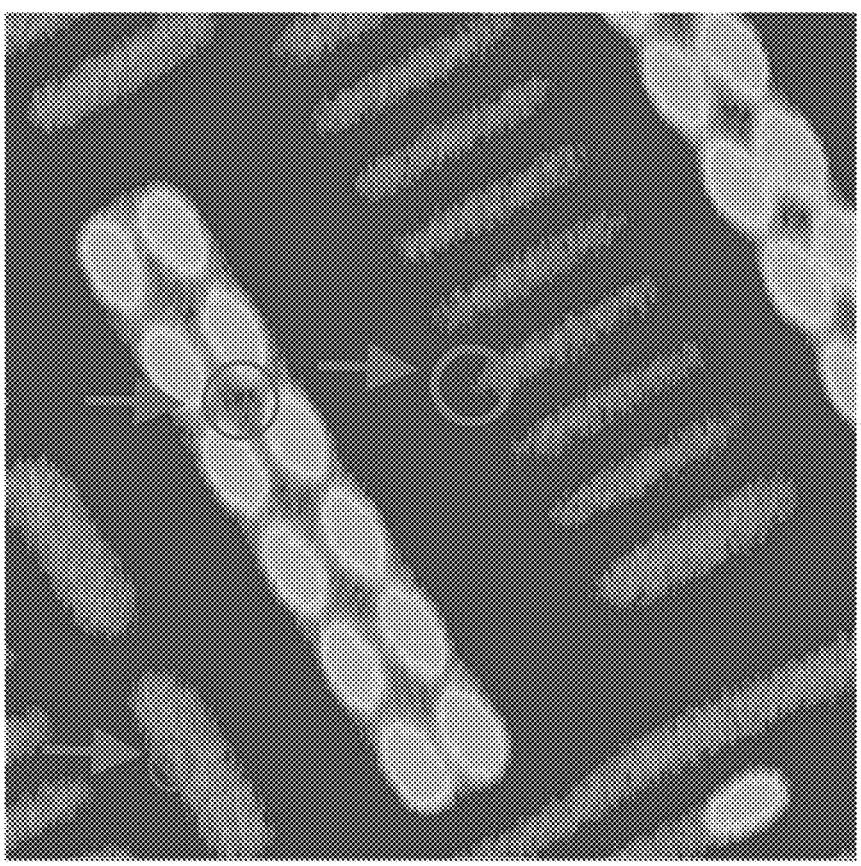

While various approaches have been proposed for image segmentation, they may typically be application-specific, with variable performance and applicability based on needs and substrate characteristics. For instance, while thresholding (i.e. assigning a label to a pixel of an image based on, for instance, a threshold intensity value) may successfully be employed on low-noise SEM images, it may perform poorly on images containing a higher degree of noise. An example of this is shown in FIGS. 1A and 1B comprising SEM images of wires on a circuit board or integrated circuit. FIG. 1A shows examples (circles indicated by arrows) of instances where thresholding may assign improper labels to pixels due to noise. Similarly, attempts to remove noise, such as through the application of a Gaussian filter, may result in reduced contrast, and/or cause separate parts of an image to appear connected, as shown in the connected wire components of the SEM image of FIG. 1B.

Figures 2A, 2B:
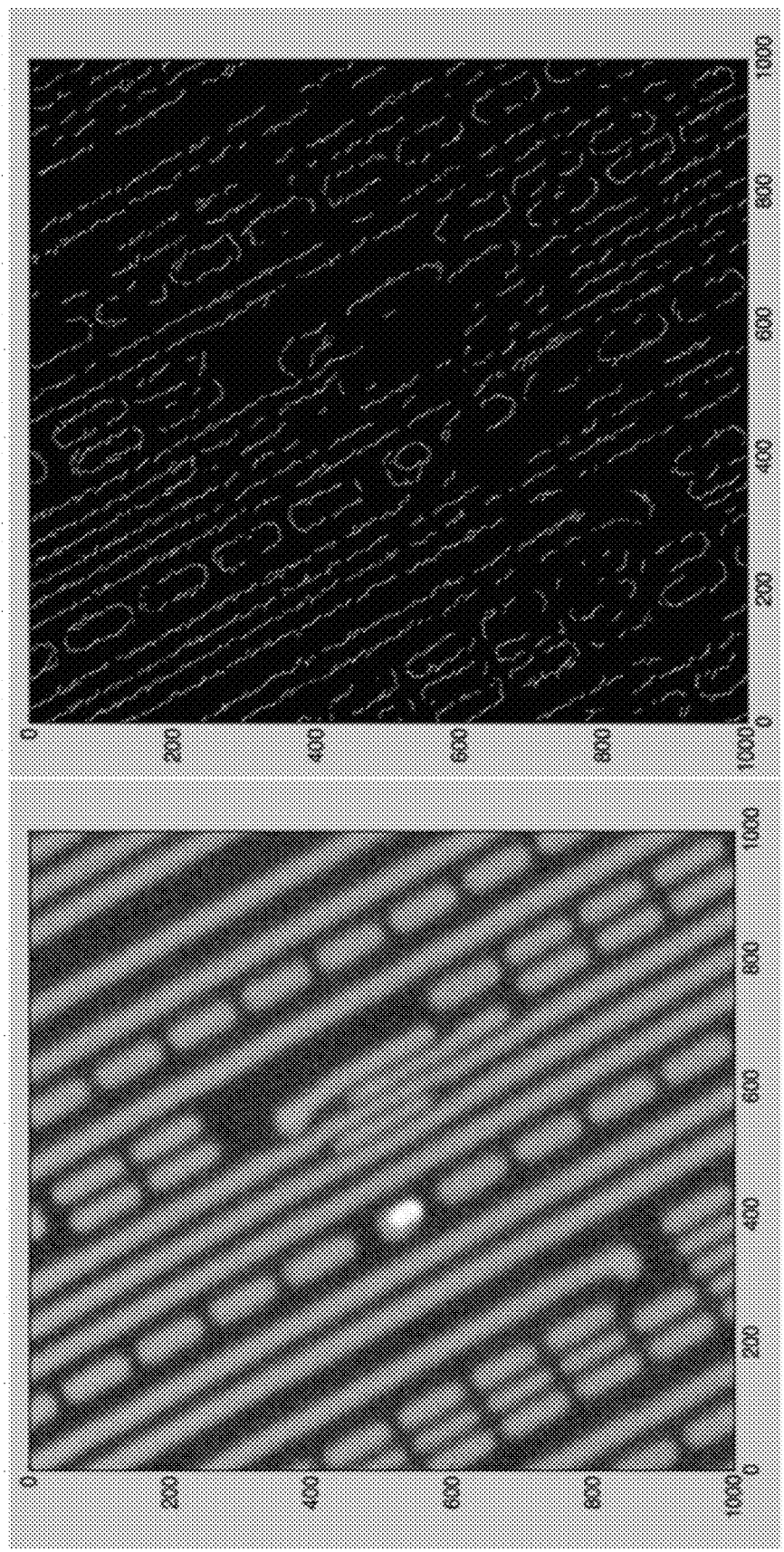
FIG. 2A is a SEM image of a substrate.
FIG. 2B is a representation of the image of FIG. 2A processed using an edge detection process.

Similarly, while Canny edge detection used in combination with thresholding may be suitable for imaging certain objects, such red blood cells, this method may not perform well, or may require too much user input and/or time, for segmenting the many various layers of a PCB board or computer chip. An example of a deficiency of this approach is shown in FIG. 2, where a noisy SEM image in FIG. 2A results in poor Canny edge detection, the results of which are shown in FIG. 2B.

Figure 3:
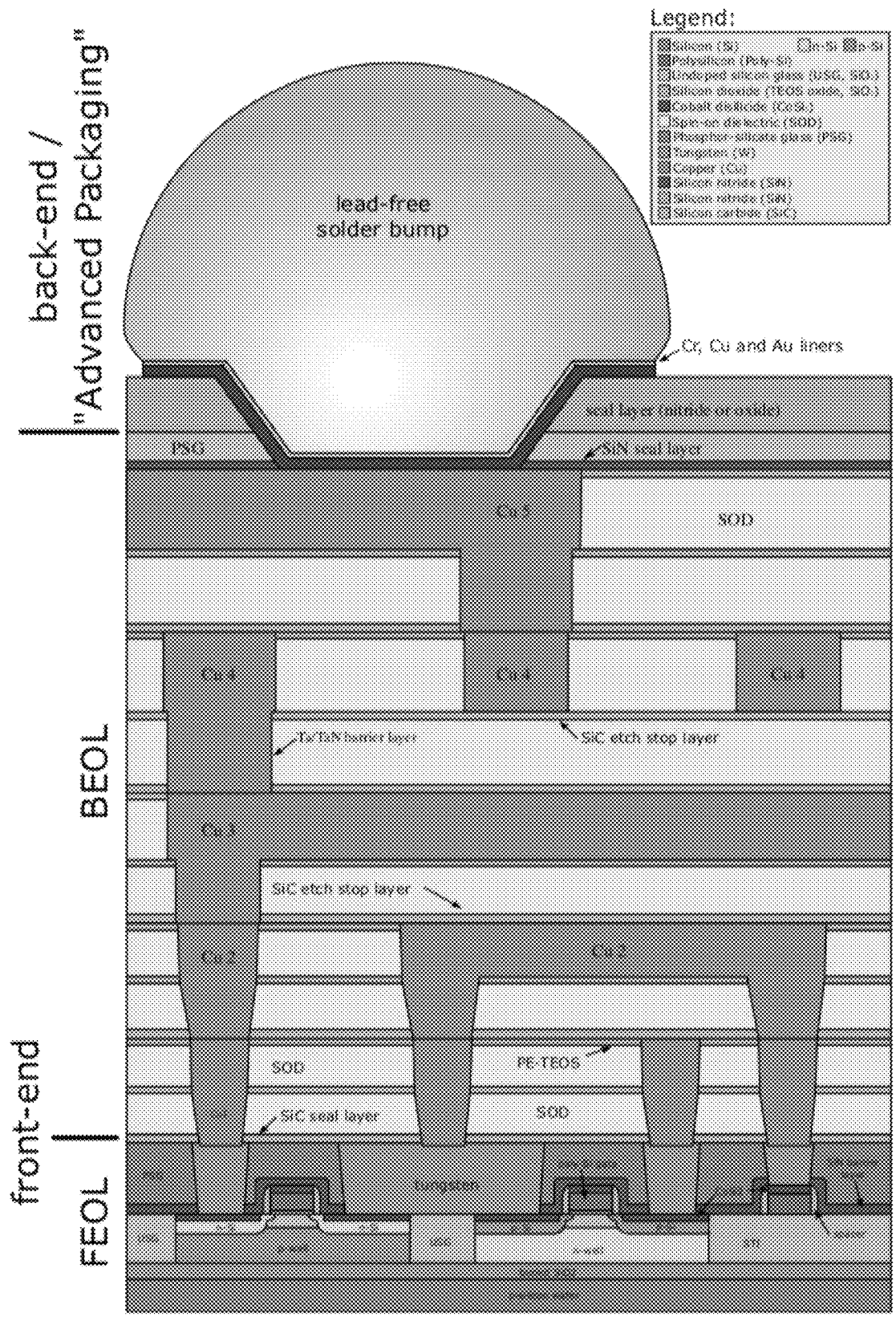
FIG. 3 is a schematic of a cross-section of a microchip, in accordance with various embodiments.

Automated approaches to image segmentation, and particularly automated approaches that may be successfully employed in a short amount of time, have much potential value in applications of, for instance, reverse engineering. For instance, integrated circuits for in computer-based systems typically comprise many layers, and often have three distinguishable components: silicon without metal, metal wires under a layer of silicon, and metal vias (through-plane wires connecting different layers of an integrated circuit). FIG. 3 shows a schematic of a typical example of such a structure, in this case with five layers of metallisation (image license is under Creative Commons Attribution 2.5 Generic by https://commons.wikimedia.org/wiki/User:Cepheiden). To image such samples, upper layers may be cut away to a horizontal plane which intersects the vias, followed by polishing of the samples. As vias connect wires in upper and lower metallisation layers, they may appear "inside" wires in resulting images. Metal of the vias may be exposed by such processes, and may result in vias being very bright features of resultant images. It would therefore be advantageous to be able to rapidly acquire SEM images on a layer-by-layer basis, and perform an accurate segmentation of the such images in order to reverse engineer connections between various wire components.

While the skilled artisan will appreciate the that systems and methods herein described apply to a broad range of imaging applications, various exemplary embodiments of the disclosure will now be provided in the context of integrated circuit images using SEM images, and/or partial SEM images or data. Various examples may include the use of various ion detectors or other raster-based imaging techniques. Non-limiting examples of such detectors may include backscattered electron (BSE) detectors, secondary electron (SE) detectors, Everhart-Thornley (E-T) detectors, through-lens detectors (TTL), in-lens detectors, AFMs, or the like.

With reference to FIGS. 4 to 14, various embodiments will now be described which utilise partial images acquired from an in-lens and a BSE detector. In accordance with some embodiments, images or partial images may be collected simultaneously so that data from each respective detector is aligned. However, the skilled artisan will appreciate that embodiments herein disclosed which utilise a plurality of partial images for segmentation purposes may also acquire images serially, for instance using a single detector. Furthermore, aspects of the disclosure may apply to systems wherein a single partial image is acquired, or conversely, more than two images, while remaining within the scope of the disclosure.

Figure 4B:
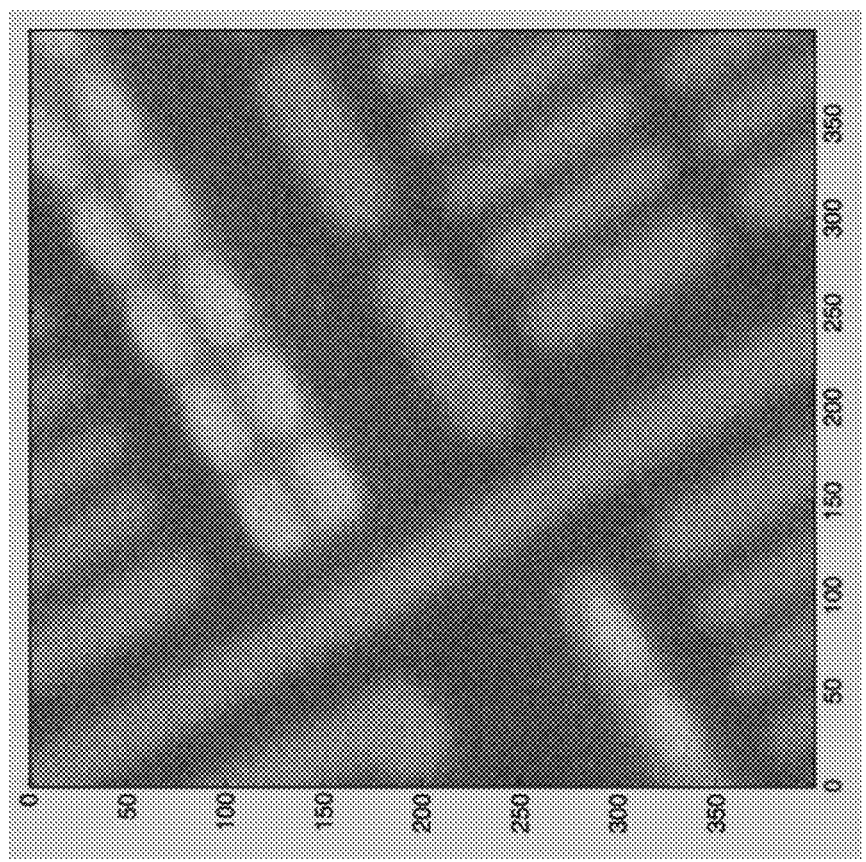
FIGS. 4A and 4B are SEM images of a substrate acquired using a backscattered electron detector and an in-lens detector, respectively, in accordance with various embodiments.
Figure 4A:
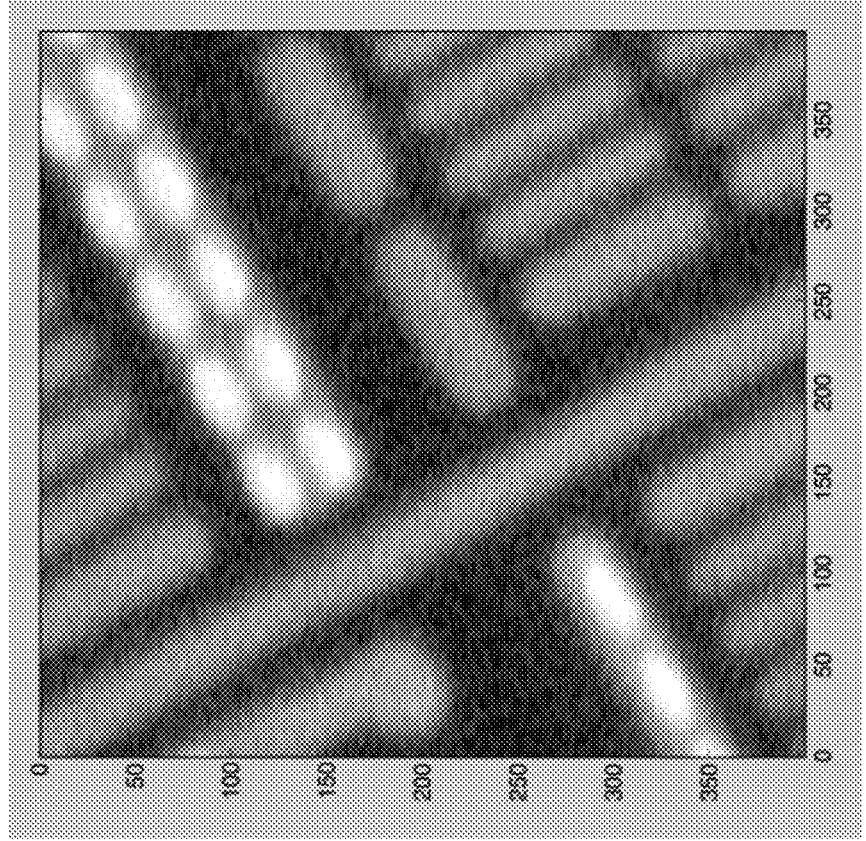

FIGS. 4A and 4B show SEM images of the same portion of a circuit chip using a backscattered electron detector (BSD) and in-lens detector, respectively. In this example, and in accordance with at least one embodiment, images were simultaneously collected with detectors rotated 30° relative to the orientation of the sample components. In accordance with some embodiments, such a configuration may be employed in the process of acquiring partial images so as to maintain a high degree of information about the extent of the components being imaged.

As can be seen in FIGS. 4A and 4B, images from different detectors may have different noise and signal contrast. The process of image fusion may allow for the combination of, for instance, respective advantages of the two images. For instance, in accordance with at least one embodiment, one may employ an algorithm to utilise the high contrast of a BSD image and the noise characteristics (e.g. white noise) of an in-lens detector image. In the following examples and description, and in accordance with various embodiments, images will be reconstructed for segmentation from partial data of such images. An example of such partial data is shown in FIGS. 5A and 5B, where only every fourth line of a typical raster scan in an SEM using a BSD and in-lens detector, respectively, is shown.

Figure 5B:
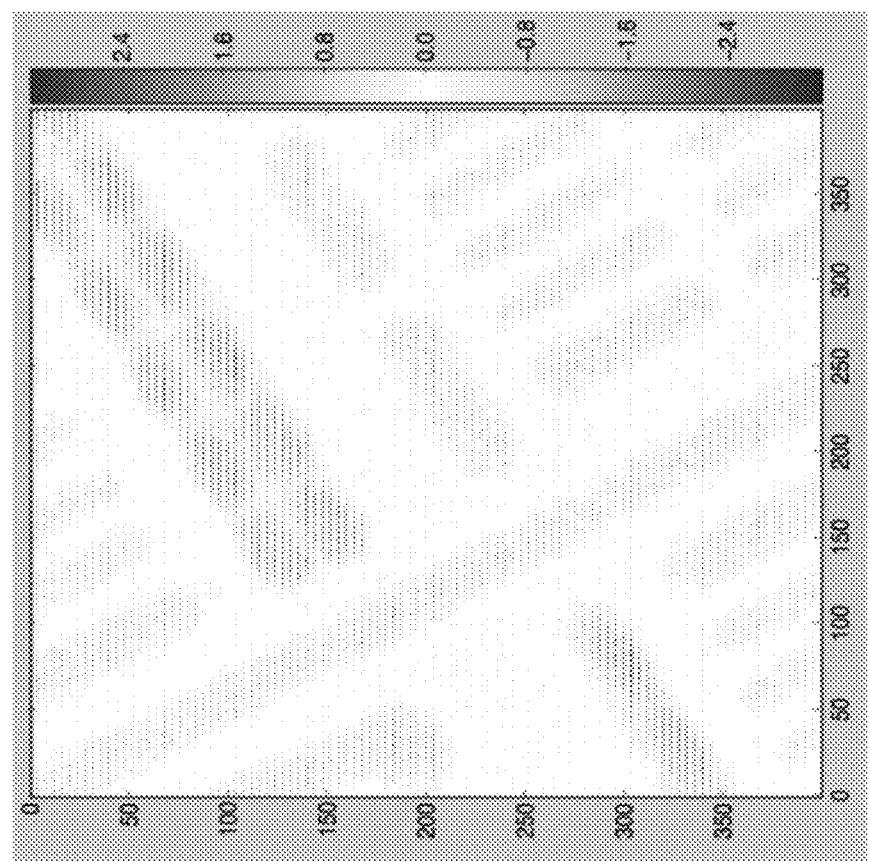
FIGS. 5A and 5B are partial images of a substrate acquired using every fourth line scan of a backscattered electron detector and an in-lens detector, respectively, in accordance with various embodiments.
Figure 5A:
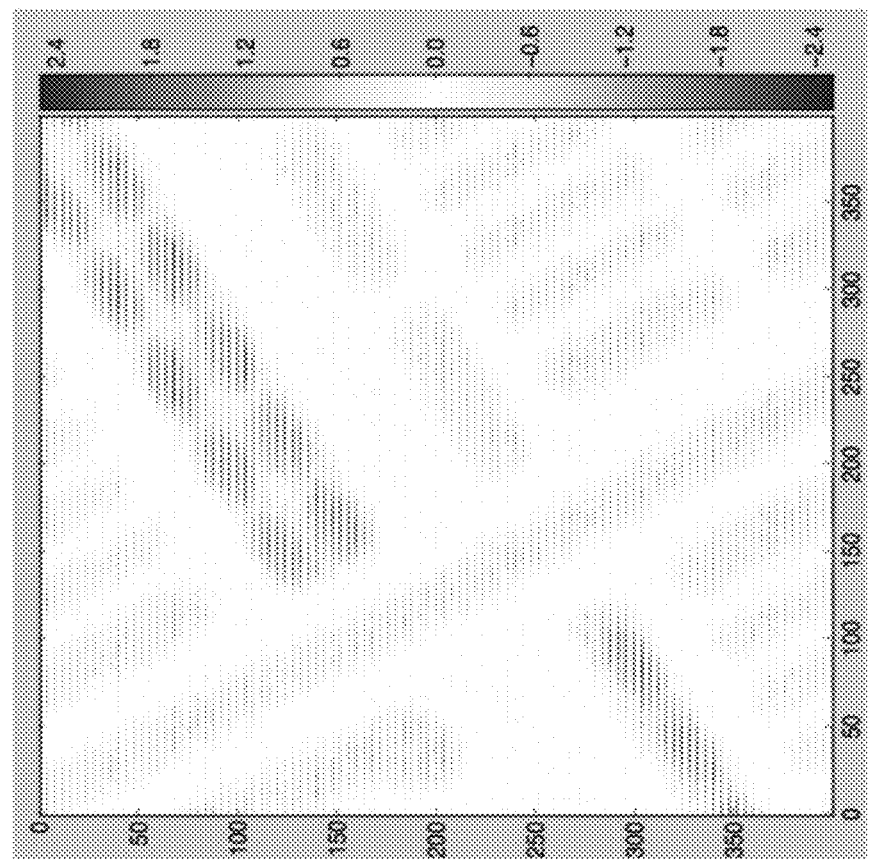
Figure 6:
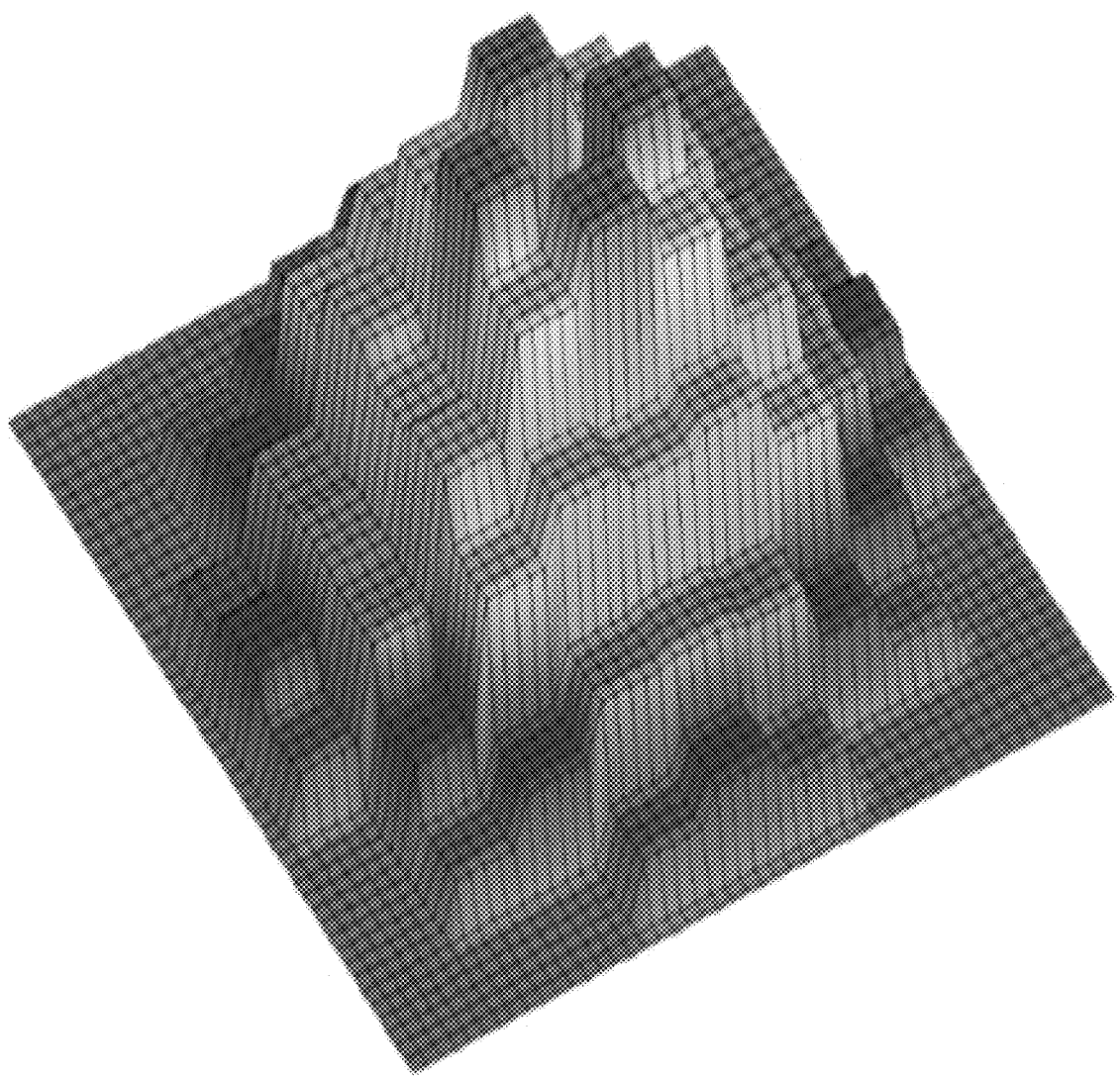
FIG. 6 is a plot of a function for weighting values of neighbouring pixels in an optimisation problem, in accordance with at least one of the various embodiments.

An approach to image segmentation from partial data, such as that shown in FIG. 5A or FIG. 5B, may be, in accordance with various embodiments, related to solving an optimisation problem(s). The following description begins with a simple exemplary optimisation problem, and adds complexity in steps. A first step may be, in accordance with one embodiment, solving the following optimisation problem.

$$\min \sum_{i \in S, j} (V_{i,j} - I_{in-lens,i,j})^2 + \lambda_1 \sum_{i,j} \sum_{(i',j') \in N} W_{i',j'} (V_{i+i',j+j'} - V_{i,j})^2$$

In this example, $V_{i,j}$ is the pixel of a reconstructed image at position (i, j), $I_{in-lens,i,j}$ is the corresponding pixel in the (partial) in-lens detector image, S is the set of scanned pixel positions, $W_{i',j'}$ is a 2D array of weights for neighbourhood comparisons, and $\alpha_1$ is a penalty parameter which determines the trade-off between fitting the data and the smoothness of a resultant image. The regularisation term, $\Sigma_{i,j}\Sigma_{(i',j') \in N}W_{i',j'}(V_{i+i',j+j'}-V_{i,j})^2$ penalises differences between a pixel and its neighbours. In accordance with some embodiments, and in several of the subsequent examples, neighbours up to a distance of 9 may be considered, and may be of the function type of illustrated in FIG. 6, where the height of the surface plot is the weight of their difference in value to the central pixel. However, the skilled artisan will appreciate that other penalty functions known in the art may be employed within solving an optimisation problem without departing from the scope of this disclosure.

In accordance with various embodiments, pixels of a reconstructed image $V_{i,j}$ may, in addition to referring to pixel locations that were not measured (i.e. do not correspond to a "measured location", also herein referred to as an "estimated location"), they may additionally refer to pixel values that have been measured. That is, in some embodiments, despite a pixel location being associated with a measured value, this value may be modified and/or overwritten (also herein referred to as "estimated") in solving an optimisation problem.

In accordance with various embodiments, FIG. 7A and FIG. 7B show the result of solving the optimisation problem described above for the partial images shown in FIGS. 5A and 5B, respectively. The resulting images may be relatively smooth, with less noticeable noise. However, image quality may still be insufficient for segmentation applications. As such, and in accordance with at least one embodiment, image fusion may be introduced into the optimisation problem.

Figures 8A, 8B, 8C:
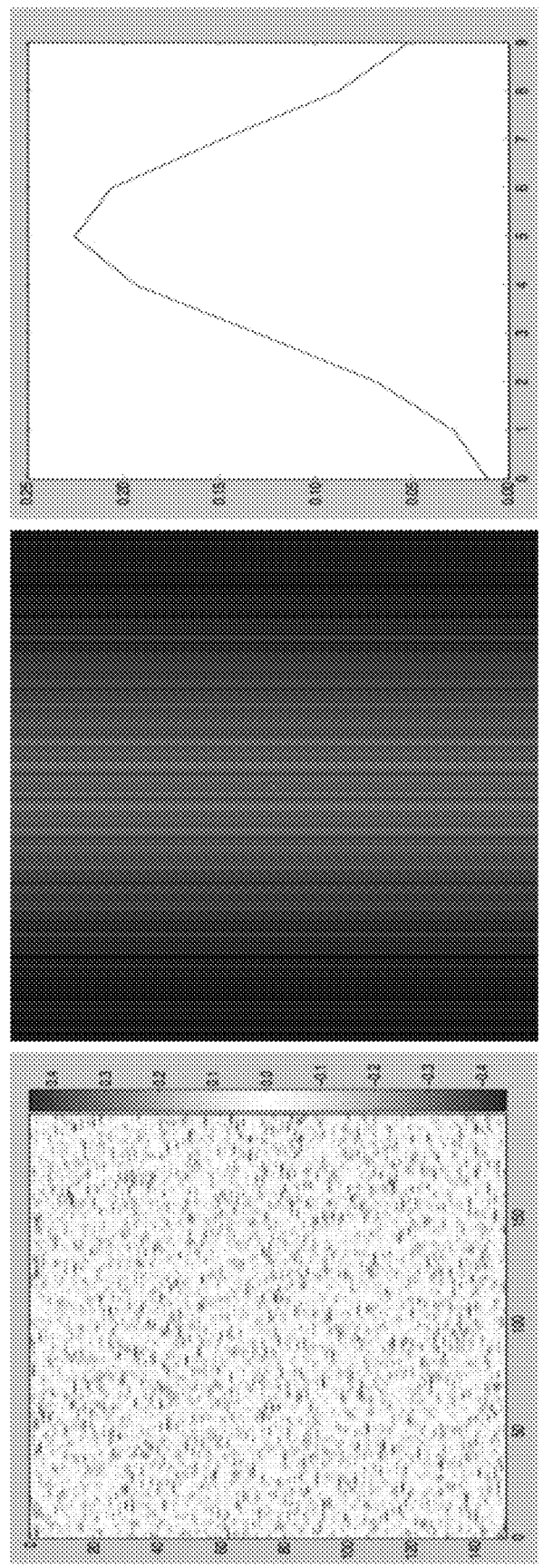
FIGS. 8A, 8B, and 8C are plots of sample noise, a fast Fourier transform of noise, and a model corresponding to noise from a sample, respectively, in accordance with various embodiments.

As mentioned above, different detectors may have different sensing properties. For instance, a BSD image typically has a higher contrast than an in-lens image, but may have non-white noise, as shown in FIG. 8A. A Fourier transform of a line of this noise (FIG. 8B) shows that noise may appear as if it is low-pass filtered. If noise is asymmetric, as it is in this example, it may in some cases be modeled as a decaying exponential. For example, and in accordance with at least one embodiment, the noise of a BSD image may be modeled as the following expression.

$$\xi(x) = \begin{cases} 0 & x \leq 5 \\ e^{-20x+10} & x > 5 \end{cases}$$

In some cases, the noise may be modeled as a Gaussian with a standard deviation of approximately 2, which may result in the shape in FIG. 8C. In this example, this function is termed B. In accordance with some embodiments, the image generated in an optimisation problem like that discussed above may be filtered by convolving the image with B symbolically as, in accordance with some embodiments, $\Sigma_k B_k V_{i+k,j}$. The difference between this convolution and the BSD image may therefore be noise with the same characteristic. Such a convolution of the difference may be considered to be a weighting of the noise by its expected spectrum, in accordance with some embodiments, and may be added to the in-lens term to create an optimisation problem which may perform image fusion through solving the following optimisation problem.

$$\min \sum_{i \in S, j} (V_{i,j} - I_{in-lens,i,j})^2 + \sum_{i \in S, j} \sum_k B_k \left( I_{BSD,i,j} - \sum_k B_k V_{i+k,j} \right)^2 +$$
$$\lambda_1 \sum_{i,j} \sum_{(i',j') \in N} W_{i',j'} (V_{i+i',j+j'} - V_{i,j})^2$$

Figure 9:
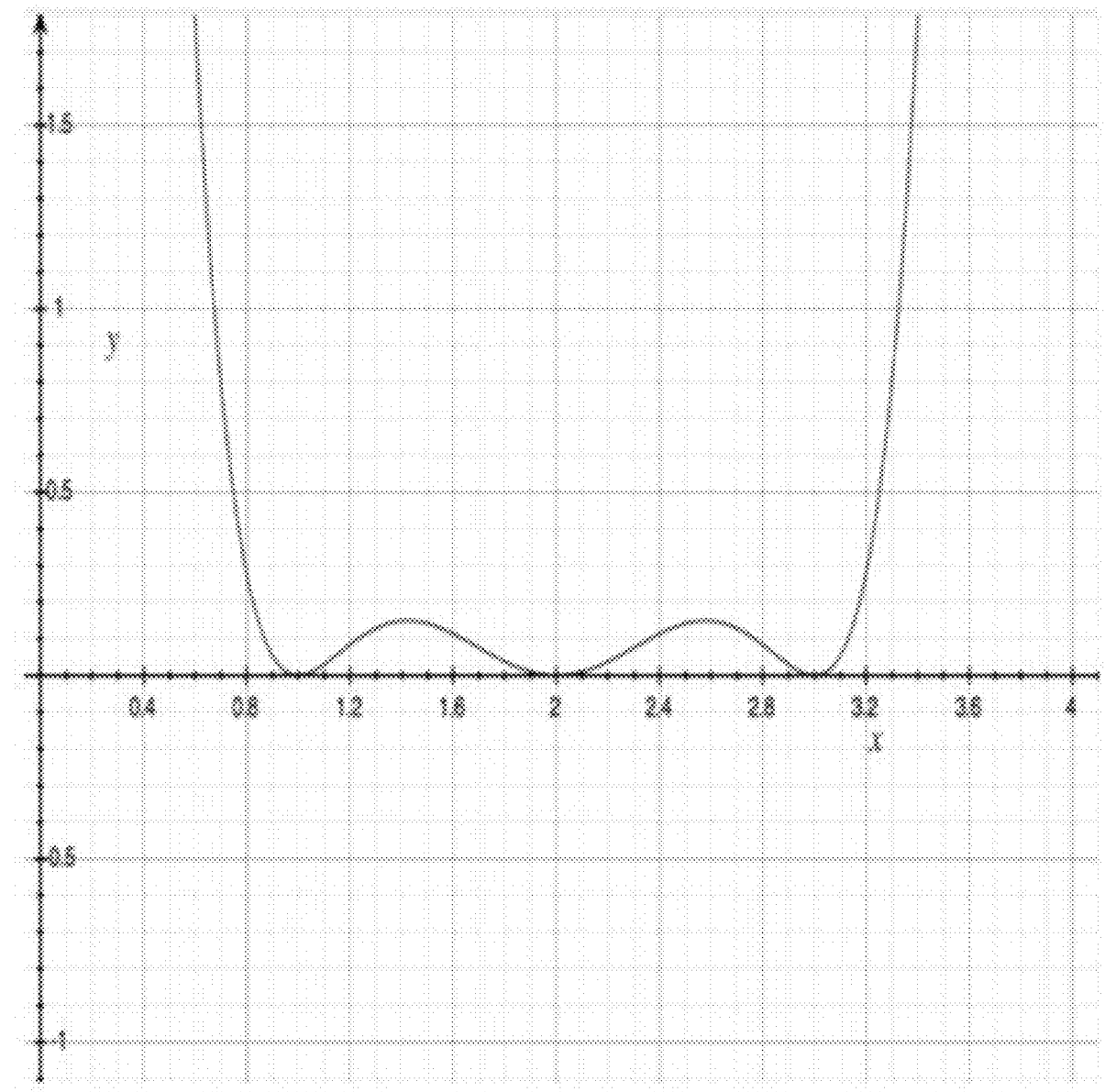
FIG. 9 is a plot of a function used in an optimisation problem that may be solved for segmenting an image, in accordance with various embodiments.

If a goal is image segmentation of a completed image, in accordance with some embodiments, a segmentation penalty term may also be introduced into an optimisation problem. FIG. 9 shows a non-limiting example of such a segmentation penalty term. In this instance, the penalty function is a sixth order polynomial formed by the product of three parabolas. While the skilled artisan will appreciate that a host of various other penalty functions may be employed, it may be advantageous to use such a term due to its simplicity which containing three minima. In accordance with some embodiments, the minima may be adjusted in a penalty function to correspond to values b, d, and v, which can be tuned based on a particular application. The skilled artisan will be appreciated that such values can be found empirically for, for instance, a given set of materials, or solved for theoretically, simulated, chosen through some optimisation process, or the like. In the following example of reverse-engineering an integrated circuit, these greyscale values correspond to those of silicon, buried metallisation, and vias. In some embodiments these values may be chosen to average pixel values, while in others they may be different from the average in order to produce a higher quality segmentation. For instance, the following exemplary embodiments employ values that do not necessarily relate to the average normalised pixel values.

An example penalty function for segmentation may therefore, in some embodiments, be of the following form.

$$\sum_{i,j}(V_{i,j}-b)^2(V_{i,j}-d)^2(V_{i,j}-v)^2$$

In accordance with some embodiments, various segmentation optimisation problems may be non-linear, and may benefit from solving algorithms comprising more than one step. In some embodiments, solving a first optimisation problem may provide a solution from which a second optimisation problem may obtain an initial guess. For instance, a first optimisation problem may provide an initial completed image guess from a partial data set or partial image, and a second optimisation step may use this initial guess to perform a segmentation. One example, in accordance with at least one embodiment, would be to solve the following problem first, which may be quadratic and insensitive to an initial guess. This problem may be interchangeably referred to throughout the disclosure as a "first problem", or "first optimisation problem," or "first step."

$$\sum_{i\in S,j}(V_{i,j}-I_{in-lens,i,j})^2 + \sum_{i\in S,j}\sum_k B_k\left(I_{BSD,i,j}-\sum_k B_k V_{i+k,j}\right)^2$$
$$+\lambda_1 \sum_{i,j}\sum_{(i',j')\in N} W_{i',j'}(V_{i+i',j+j'}-V_{i,j})^2$$

In some embodiments, this may be followed by a second step, which, in accordance with some embodiments, may be sensitive to a starting guess, and may comprise a non-convex problem, non-quadratic optimisation problem resembling the following equation set, which is herein interchangeably referred to as a "second problem", or "segmentation problem," or "second optimisation problem," or "second step."

$$\sum_{i\in S,j}(V_{i,j}-I_{in-lens,i,j})^2 + \sum_{i\in S,j}\sum_k B_k\left(I_{BSD,i,j}-\sum_k B_k V_{i+k,j}\right)^2 +$$
$$\lambda_1 \sum_{i,j}\sum_{(i',j')\in N} W_{i',j'}(V_{i+i',j+j'}-V_{i,j})^2 + \lambda_2 \sum_{i,j}(V_{i,j}-b)^2(V_{i,j}-d)^2(V_{i,j}-v)^2$$

In the abovementioned embodiments, two parameters $\lambda_1$ and $\lambda_2$ may be chosen or solved to control the weight and/or relative weight of the penalty functions. For example, in some embodiments, increasing the parameter $\lambda_1$ may increase the smoothness (or blurriness) of a resultant image from a first optimisation step. If increased to a significant extent, this may even result in all pixels being assigned to a single segment upon completion of the second step. Increasing $\lambda_2$, on the other hand, may increase the attraction of pixel values to the assigned segment values (i.e. b, d, v). In such a situation, if $\lambda_2$ is too large, the solution after the second step mentioned above may resemble a rounded-off version of the initial guess from the first step, lowering the relative importance of the smoothing penalty (i.e. the fit-to-data term may be relatively ignored).

In accordance with some embodiments, segmentation problems may be solved in two broad optimisation solution steps, as described above. However, in some embodiments, additional steps may also be performed that remain within the scope of this disclosure. For instance, it may be advantageous to normalise pixel intensity values prior to solving an optimisation problem. For example, if both an BSD and in-lens detector acquired partial images (e.g. acquired every nth line across a sample), one may first normalise $I_{BSD}$ and $I_{in-lens}$ pixel values to be in a specific range (e.g. between 0 and 2), in accordance with at least one embodiment.

Figure 10B:
FIG. 10B is a segmented image generated by solving an optimisation problem seeded with the image of FIG. 10A as an initial guess, in accordance with various embodiments.
Figure 10A:
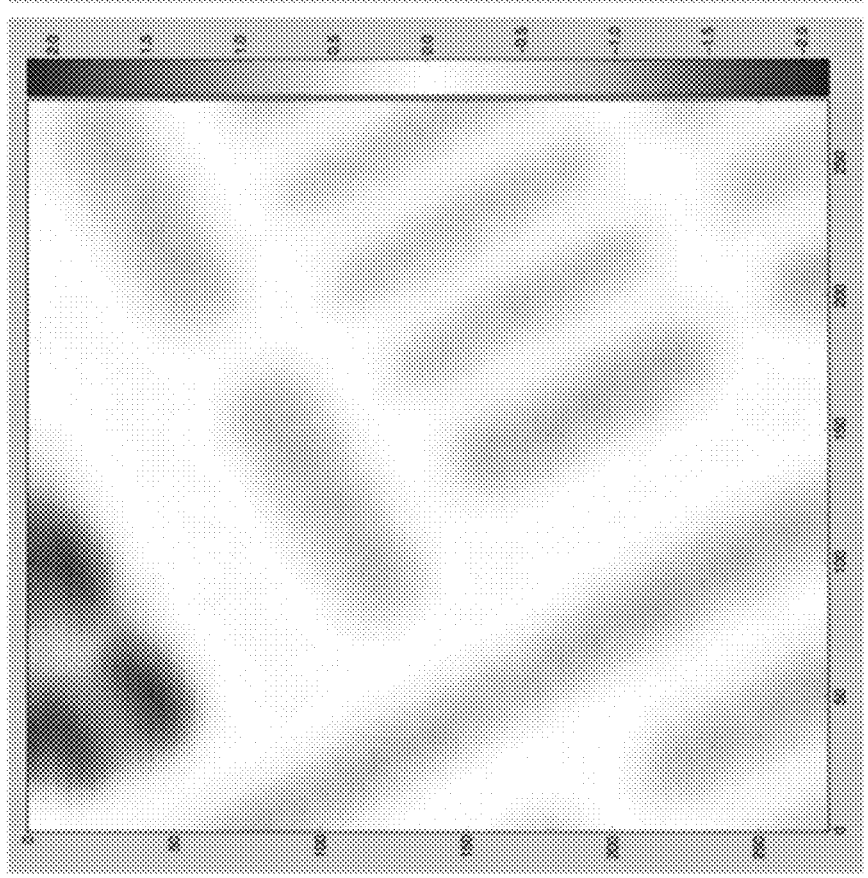
FIG. 10A is an image that is reconstructed from every fourth line scan of a substrate by solving an optimisation problem.

The results of the two broad optimisation problems following a normalisation of pixel intensities to be within the range [0, 2] are shown in FIG. 10. In this example, and in accordance with various embodiments, every fourth line scan of an integrated circuit in an SEM from a BSD detector and in-lens detector were provided as input. FIG. 10A shows a completed image from every fourth line scan from the first optimisation problem, while FIG. 10B shows a segmented image following the second optimisation problem, which was seeded with the solution from the first step as an initial guess (i.e. the second step was given FIG. 10A as an initial guess), in accordance with at least one embodiment. In this example, the second step was given the parameters b=0, d=1, v=2, $\lambda_1$=40 000, and $\lambda_2$=100 000.

In some embodiments, such as in applications of, for instance, segmenting images of integrated circuits or other electronic devices, connectivity between components may be more important in an output segmented image than the actual dimensions or thickness of individual components. For instance, in the upper layers of computer chips, wires may be thicker with more space between them, which may result in higher quality segmentation than with lower layers of a chip where components are more densely packed. For instance, when wires are quite close to each other, partial SEM images or line scans may not produce a distinct enough intensity change between wires to resolve them (i.e. the greyscale value between wires may never reach an expected value of b).

Figure 11A:
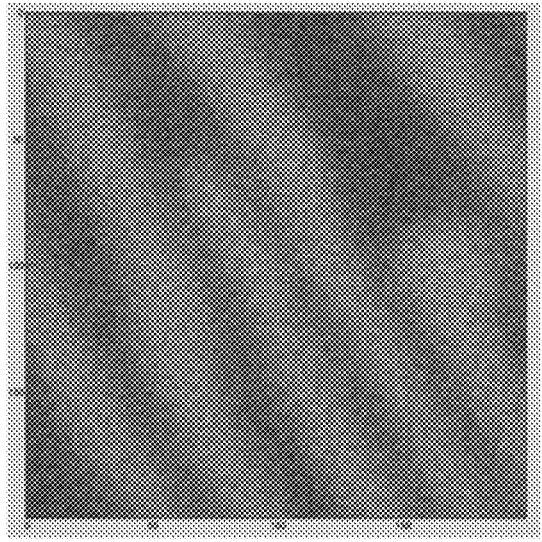
FIG. 11A is backscattered electron image of a substrate.
Figure 11B:
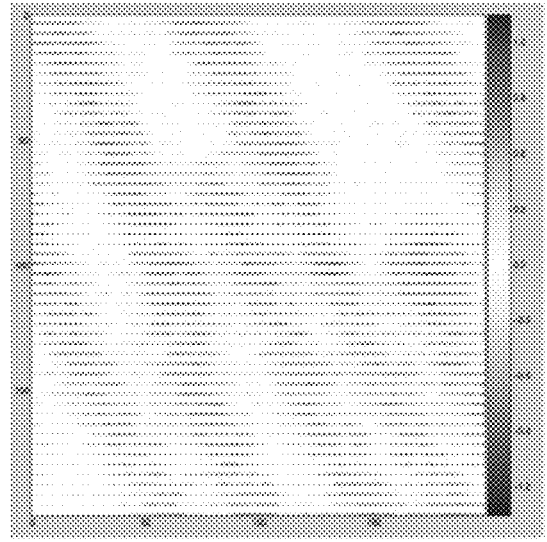
FIGS. 11B and 11C are partial images with every fourth line scan of the substrate of FIG. 11A as acquired by a backscattered electron detector and an in-lens detector, respectively.
Figure 11C:

FIGS. 11A to 11D show an example of an integrated circuit densely packed with wires, in accordance with one embodiment. In this example, FIG. 11A shows a BSD image of the sample. FIGS. 11B and 11C show partial images of one fourth of the line scans, as acquired by the BSD and an in-lens detector, respectively. The result of solving the first optimisation problem described above is shown in FIG. 11D.

Figure 11D:
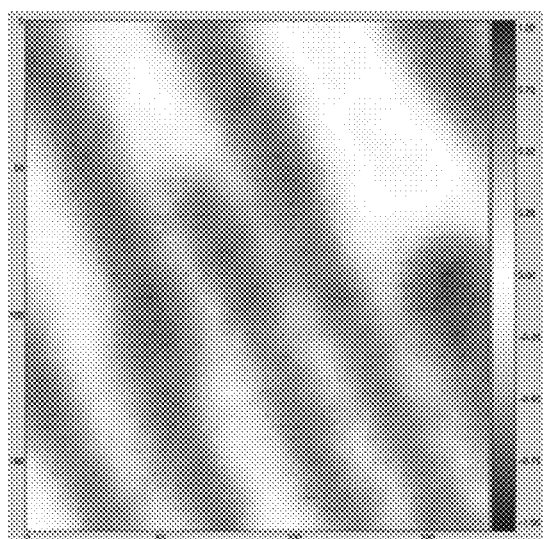
FIG. 11D is an image of the substrate that is reconstructed from the images in FIGS. 11B and 11C, in accordance with various embodiments.
Figure 12B:
FIGS. 12A to 12D are segmented images of the reconstructed image of FIG. 11D as generated by solving an optimisation problem using the parameter sets shown in the corresponding respective tables.
Figure 12D:
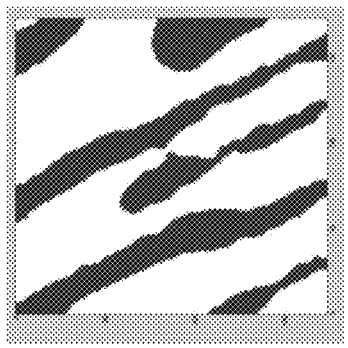
Figure 12A:
Figure 12C:

The results of a second optimisation step using the image shown in FIG. 11D as an initial guess are shown for various parameter sets in FIG. 12. In accordance with one embodiment, a "default" parameter set may be those shown in the table of FIG. 12A. In this example, however, false connections are shown in the resultant segmented image of FIG. 12A. In accordance with various embodiments, the parameter sets can be tuned, either manually by a user or automatically, to adjust optimisation for wire thickness, boundary smoothness, connectivity, and the like. Examples of such embodiments are shown in FIGS. 12B to 12D. For instance, modifying the greyscale values associate with background (e.g. silicon) and wires (i.e. b and d, in this example, respectively) can adjust the apparent thickness and connectivity of wires. In this example, FIG. 12D shows a parameter set with relatively high background and wire greyscale values, which produces a segmented image that has fully resolved wires, in accordance with one embodiment.

Figure 13A:
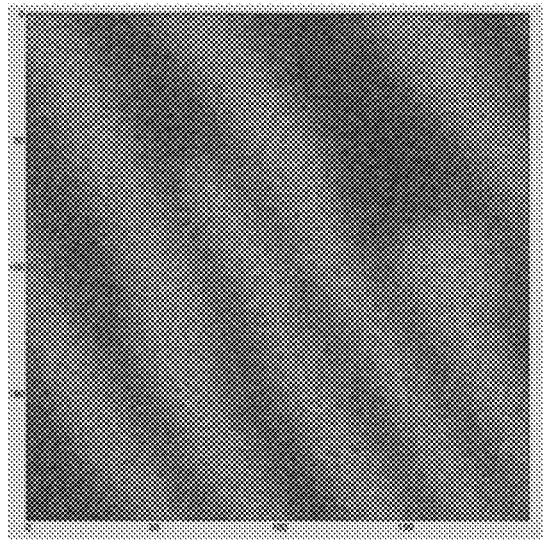
FIG. 13A is backscattered electron image of a substrate.
Figure 13B:
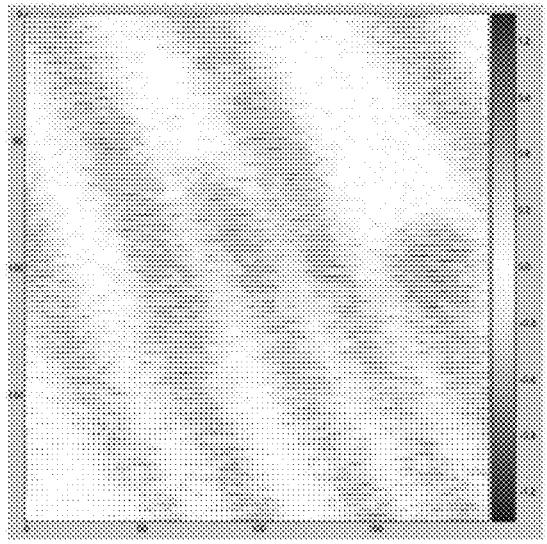
FIGS. 13B and 13C are partial images with every second line scan of the substrate of FIG. 13A as acquired by a backscattered electron detector and an in-lens detector, respectively.
Figure 13C:
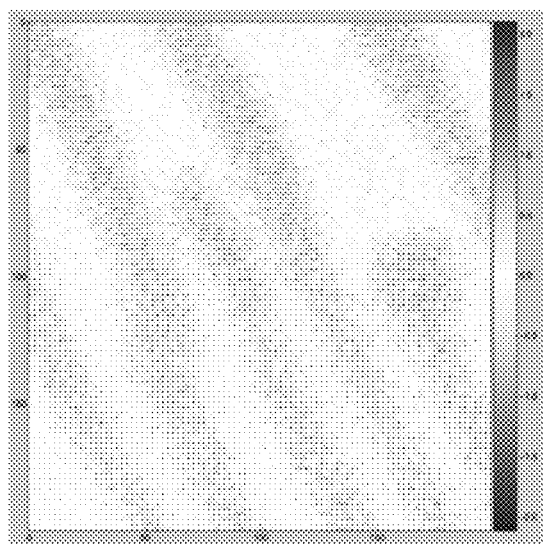
Figure 13D:
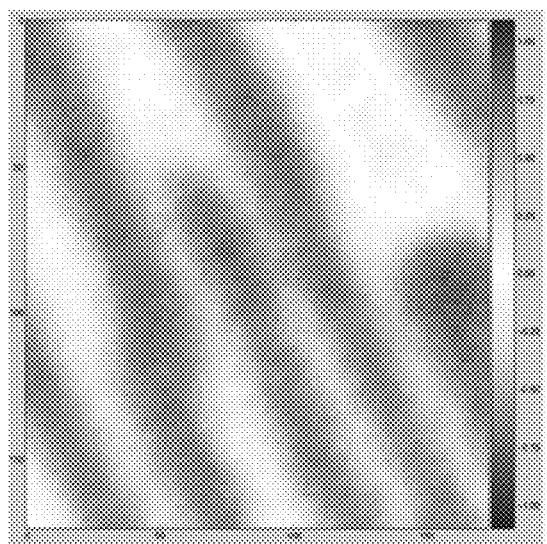
FIG. 13D is an image of the substrate that is reconstructed from the images in FIGS. 11B and 11C, in accordance with various embodiments.
Figure 14A:
FIGS. 14A to 14D are segmented images of the reconstructed image of FIG. 13D as generated by solving an optimisation problem using the parameter sets shown in the corresponding respective tables.
Figure 14B:
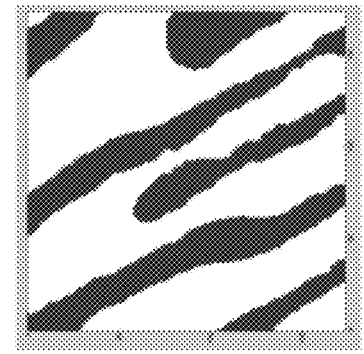
Figure 14C:
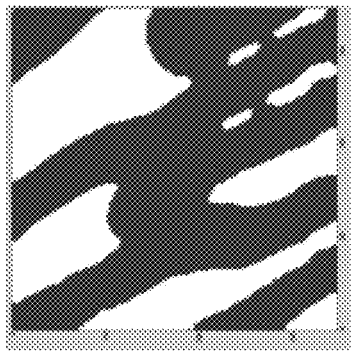
Figure 14D:
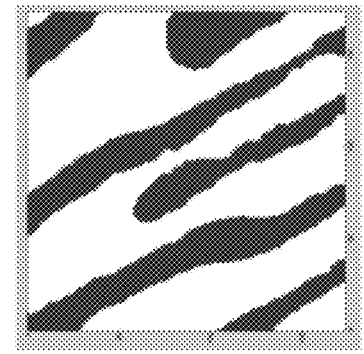

For certain image completion and/or segmentation applications, and in accordance with various embodiments, optimisation solutions may be improved by acquiring an increased amount of data points (e.g. every second or third line rather than every fourth line in an SEM raster scan, for instance). FIG. 13 shows SEM imaging of the same sample as FIG. 11, but in this case, FIGS. 13B and 13C show pixel intensities for every second line acquired from SEM imaging using a BSD detector and in-lens detector, respectively, rather than every fourth line, as shown in FIG. 11. The completed image from a first optimisation step is shown in FIG. 13D. Segmented images resulting from solving a second optimisation problem using different segmentation parameters are shown in FIGS. 14A to 14D, which used as an initial guess the completed image of FIG. 13D. As with the previous embodiment, this example, which began using every second line scan from BSD and in-lens detectors, also provides a segmented image with fully resolved wires with the parameter set shown in FIG. 14D.

The various non-limiting embodiments described in FIGS. 4 to 14 are further schematically illustrated in FIG. 15. In this exemplary process diagram, two detectors 1502 and 1504 acquire partial image data, which is utilised by a first optimisation problem algorithm 1510 in order to generate a more complete image. Exemplary functions in problem 1510 may include, but are not limited to, in-filling 1514, image fusion 1512, and the like. In accordance with various embodiments, a solution to the first problem 1510 may provide an image 1520, which, may serve as an initial guess to a subsequent second optimisation problem 1530. Non-limiting examples of functions that may optionally be included in the second problem 1530 are those that were initially included in the first problem 1510, such as image fusion terms 1532 or image infilling/adjustment terms 1534, as well as terms and/or parameters related to image segmentation 1536. In accordance with various embodiments, a solution to the second optimisation problem may comprise a segmented image 1540.

Various embodiments of the present disclosure relate to an optimisation model(s) for estimating a segmentation image based on partial image data. In yet other embodiments, complete image data can be used with various segmentation algorithms herein disclosed, or images completed from partial data can be used in similar segmentation algorithms. In some embodiments, (partial) image data may be acquired in one or more SEM detectors, non-limiting examples of which may include backscattered electron detectors and/or secondary electron detectors. In some embodiments, a single detector may be used to acquire multiple data sets for the same regions of a sample. For instance, one embodiment may comprise a BSD detector acquiring data from the same line locations of a sample sequentially at different angles, from which optimisation algorithms similar to those disclosed may perform image fusion, completion and segmentation. In other embodiments, more than one of the same type of detector can be employed for sensing, or various combinations of detectors can be employed, either in parallel (simultaneously) or sequentially (e.g. two BSE detectors, and one SE detector). In other embodiments, a single detector (e.g. a BSD) can be used to sparsely sample data from a surface to be imaged, and the sparsely sampled data can then be used in optimisation solutions as herein described.

As such, various elements represented in FIG. 15 may be removed, altered, or added to, in accordance with various embodiments. In one embodiment, a detector, such as a SEM detector, may sparsely sample a substrate surface to obtain a partial image 1610. The partial image may serve as input for a function or series of functions that may provide as higher degree of resolution by, for instance, in-filling via an optimisation problem, in element 1620. Either simultaneously or subsequently, a problem may be algorithmically, iteratively, or otherwise digitally processed as in step 1630 to provide an output image 1640 which is segmented into a designated number of components. For example, a microchip may be partially imaged in 1610 using a BSD detector, while a segmented image is output at 1640 which comprises three colours corresponding to silicon, wires, and vias.

Yet other embodiments may also employ various scan patterns to obtain partial or complete datasets and/or images. For instance, while the abovementioned examples present embodiments wherein data was utilised in optimisation problems from parallel lines of SEM scanning of samples, other embodiments may include, but are not limited to, scanning every nth line in alternating directions (e.g. in the positive horizontal direction, then the negative x-direction), performing line scans first horizontally separated a distance y followed by vertical line scans spaced by x, scanning in Lissajous patterns, measuring in random sample regions (e.g. sampling in random selected regions that comprise 10% of a sample surface), or other forms of sparse sampling or downsampling, which may, for instance, improve resultant images and/or solutions to the optimisation problems herein described, or reduce sampling time while providing adequate quality and noise properties of resultant images.

In yet other embodiments, images may be constructed of various dimensions. For instance, while the abovementioned embodiments described segmenting a 2D surface, 3D segmentation could also be performed using the methods and systems herein described. For example, acquiring data from the same sample regions from different angles could be used to reconstruct 3D topologies, for instance using "(de)shadowing" techniques, various forms of which will be appreciated by the skilled artisan. In other embodiments, 3D topologies may be recreated from sets of 2D segmented images, for instance by stacking segmented 2D images to reconstruct a 3D substrate, such as a microchip.

In various embodiments, various regularisation and cost functions may be applied in optimisation problems, examples of which may include, but are not limited to, squared-difference-of-neighbours regularisation, n-degree polynomials and/or L-curve parameter selection.

In some measurement schemes, data acquired from various detectors may be a function of energies involved in measurements. For example, relatively higher beam energies in SEM measurements, such as those produced at higher operating voltages, may allow electrons to penetrate samples to a higher degree. Such data may provide, in accordance with at least one embodiment, information about a sample volume and/or interaction volume, rather than just sample surface. Similarly, voltages may be reduced in some embodiments where only data related to a sample surface layer may be desired. In various embodiments, different measurement energies and electric fields may be employed to extract various datasets, which can be used individually or in combination in optimisation problems such as those herein disclosed. Such data provided by tuning of various sensing parameters, such as voltage, could be employed, in various embodiments, to construct 2D and/or 3D models of a sample, for instance, in reverse-engineering applications.

In various other embodiments, sampling patterns (e.g. lines) may be selected based on a relative orientation of sample features. For instance, in circuit board or integrated circuit reverse-engineering applications, if wires in a sample are oriented horizontally, line patterns may be chosen to be slightly askew from horizontal (e.g. 3 degrees to 20 degrees rotated from horizontal) in order to produce higher quality completed images and/or segmented images. Such skew angles may be arbitrarily chosen, empirically determined based on sample properties, optimised for either manually or algorithmically, or the like. Similarly, for a given scan pattern, a sample may be rotated in some embodiments to produce an offset in feature angles relative a scan pattern, or relative to designated Cartesian coordinate axes.

The skilled artisan will appreciate that while some of the embodiments herein described employed algorithms written in Python using Pyomo in combination with Ipopt, various computational languages, packages, operating system, algorithms with improved computational speed, and the like, may be employed in various embodiments without departing from the scope of this disclosure.

While the present disclosure describes various embodiments for illustrative purposes, such description is not intended to be limited to such embodiments. On the contrary, the applicant's teachings described and illustrated herein encompass various alternatives, modifications, and equivalents, without departing from the embodiments, the general scope of which is defined in the appended claims. Except to the extent necessary or inherent in the processes themselves, no particular order to steps or stages of methods or processes described in this disclosure is intended or implied. In many cases the order of process steps may be varied without changing the purpose, effect, or import of the methods described.

Information as herein shown and described in detail is fully capable of attaining the above-described object of the present disclosure, the presently preferred embodiment of the present disclosure, and is, thus, representative of the subject matter which is broadly contemplated by the present disclosure. The scope of the present disclosure fully encompasses other embodiments which may become apparent to those skilled in the art, and is to be limited, accordingly, by nothing other than the appended claims, wherein any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims. Moreover, no requirement exists for a system or method to address each and every problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, that various changes and modifications in form, material, work-piece, and fabrication material detail may be made, without departing from the spirit and scope of the present disclosure, as set forth in the appended claims, as may be apparent to those of ordinary skill in the art, are also encompassed by the disclosure.

What is claimed is:

1. A system for segmenting a plurality of features of a substrate from sparse imaging data, the substrate comprising a plurality of features, the system comprising:
   a digital application operable to receive as input sparse imaging data related to an intensity value, as measured by a particle sensor, associated with post-impingement particles resulting from impingement of a substrate surface with a particle beam at each of a plurality of sensing locations, and at least one other particle sensor different from the particle sensor, said plurality of sensing locations defining a subset of locations within an area of interest of the substrate, said digital application further operable to:
   calculate, for each sensing location, a measured intensity based on the intensity value of the plurality of sensing locations;
   calculate, for each of a plurality of estimated locations defining a further subset of said area of interest, a corresponding estimated intensity based on a noise property of said one or more proximal measured intensities and at least one of the following corresponding to one or more locations proximal to each of the plurality of estimated locations: one or more proximal measured intensities, and one or more proximal estimated intensities, wherein said noise property for each proximal measured intensity is determined based on a difference between noise measured by said particle sensor and said at least one other particle sensor at the sensing location corresponding thereto; and
   segment each of said plurality of estimated locations, based on said corresponding estimated intensity, and each of said plurality of sensing locations, based on a corresponding measured intensity, to correspond to one of the plurality of features.

2. The system of claim 1, wherein said calculation of the measured intensity is further based on at least one of the following corresponding to one or more locations proximal to the plurality of sensing locations:
   one or more proximal measured intensities, and one or more proximal estimated intensities.

3. The system of claim 1, wherein said calculation of said measured intensity and said corresponding estimated intensity comprises digitally solving an optimisation problem.

4. The system of claim 1, wherein each said corresponding estimated intensity is calculated based on a distance between the corresponding estimated location and each location of the one or more proximal measured intensities and one or more proximal estimated intensities used in calculating the corresponding estimated intensity.

5. The system of claim 1, wherein the digital application is operable to segment said one or more proximal estimated intensities by calculating a greyscale value at each of said plurality of estimated locations.

6. The system of claim 1, wherein the digital application is operable to segment said one or more proximal estimated intensities by solving an optimisation problem.

7. The system of claim 6, wherein said optimisation problem comprises a penalty function related to an expected intensity corresponding to each of the plurality of features of the substrate.

8. The system of claim 7, said calculation of said corresponding estimated intensity includes an initial guess for said segmenting estimated intensities to correspond to one of the plurality of features.

9. The system of claim 7, wherein the digital application is further operable to:
   generate a plurality of segmented images, each of said plurality of segmented images corresponding to a designated layer of the substrate; and
   vertically align said plurality of segmented images to determine interconnections therebetween in said substrate.

10. The system of claim 1, further operable to generate a segmented image illustrating connectivity of components of said substrate.

11. The system of claim 1, wherein said plurality of sensing locations comprises one or more lines oriented in more than one direction.

12. The system of claim 11, wherein said one or more lines are rotated relative to an orientation of one or more of the plurality of features of the substrate surface.

13. The system of claim 1, wherein said plurality of sensing locations comprises either one of: a Lissajous pattern or an optimised pattern.

14. The system of claim 1, wherein said particle beam comprises an electron beam, and wherein said particle sensor comprises one of an in-lens sensor, a backscattered electron sensor, a segmented backscatter detector, and an Everhart-Thornley detector.

15. The system of claims 1, further comprising an electron microscope operable to impinge the substrate with the particle beam and comprising said particle sensor.

16. The system of claim 1, wherein said particle sensor comprises at least two particle sensors, and wherein said digital application receives said sparse imaging data related to said intensity value as measured simultaneously by said at least two particle sensors.

17. The system of claim 16, wherein said measured intensity is calculated from a combination of intensity values measured by each of said at least two particle sensors.

18. A method for segmenting a plurality of features of a substrate from sparse imaging data, the substrate comprising a plurality of features, the method comprising:

impinging a substrate surface with a particle beam at each of a plurality of sensing locations, said plurality of sensing locations defining a subset of locations within an area of interest of the substrate surface;

measuring at each of said plurality of sensing locations using a particle sensor an intensity value associated with post-impingement particles resulting from said impinging as well as a noise property for said intensity value based on a difference between noise measured by said particle sensor and noise measured by at least one other particle sensor in association with the same sensing location, the at least one other partic le sensor being different from the particle sensor;

calculating, for each of the plurality of sensing locations, a measured intensity based on the intensity value of the plurality of sensing locations;

calculating, for each of a plurality of estimated locations defining a further subset of said area of interest, a corresponding estimated intensity based on the noise property of said one or more proximal measured intensities and at least one of the following corresponding to one or more locations proximal to each of said plurality of estimated locations: one or more proximal measured intensities, and one or more proximal estimated intensities; and segmenting each of said plurality of estimated locations, based on said corresponding estimated intensity, and each of said plurality of sensing locations, based on said corresponding measured intensity, to correspond to one of the plurality of features.

* * * * *